US011769937B2

(12) United States Patent
Kim

(10) Patent No.: US 11,769,937 B2
(45) Date of Patent: Sep. 26, 2023

(54) ELECTRONIC DEVICE PROVIDING MILLIMETER WAVE COMMUNICATION, AND MOUNTING MEMBER

(71) Applicant: Samsung Electronics Co., Ltd., Gyeonggi-do (KR)

(72) Inventor: Jinwook Kim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/716,110

(22) Filed: Apr. 8, 2022

(65) Prior Publication Data

US 2022/0231400 A1 Jul. 21, 2022

Related U.S. Application Data

(63) Continuation of application No. PCT/KR2020/013789, filed on Oct. 8, 2020.

(30) Foreign Application Priority Data

Oct. 11, 2019 (KR) .................. 10-2019-0126017

(51) Int. Cl.
*H01Q 1/12* (2006.01)
*H01Q 1/42* (2006.01)
*H04B 7/155* (2006.01)

(52) U.S. Cl.
CPC ........... *H01Q 1/1221* (2013.01); *H01Q 1/428* (2013.01); *H04B 7/15507* (2013.01)

(58) Field of Classification Search
CPC .... H01Q 1/1221; H01Q 1/428; H01Q 1/1228; H01Q 1/02; H01Q 1/241; H01Q 1/246; H01Q 3/02
See application file for complete search history.

(56) References Cited

U.S. PATENT DOCUMENTS

2002/0005817 A1* 1/2002 Wanat .................. H01Q 1/125
343/882
2012/0037257 A1 2/2012 Burke, II
2017/0215090 A1 7/2017 Lipowski et al.

FOREIGN PATENT DOCUMENTS

| CN | 107404328 A * | 11/2017 | ......... B60R 11/0241 |
|---|---|---|---|
| KR | 2001-0005274 A | 1/2001 | |
| KR | 10-2003-0019736 A | 3/2003 | |
| KR | 20-0429199 Y1 | 10/2006 | |
| KR | 10-2010-0025404 A | 3/2010 | |
| KR | 10-2010-0098001 A | 9/2010 | |
| KR | 10-2011-0023516 A | 3/2011 | |
| KR | 10-1355578 B1 | 1/2014 | |
| KR | 10-2016-0033305 A | 3/2016 | |

* cited by examiner

*Primary Examiner* — Hoang V Nguyen
(74) *Attorney, Agent, or Firm* — Cha & Reiter, LLC

(57) ABSTRACT

According to an embodiment of the present disclosure, an electronic device for communicating with an external electronic device while coupled to a mounting member that can be fixed to a wall or window of a building may be provided.

16 Claims, 26 Drawing Sheets

ELECTRONIC DEVICE PROVIDING
MILLIMETER WAVE COMMUNICATION,
AND MOUNTING MEMBER

CROSS-REFERENCE TO RELATED APPLICATION(S)

This application is continuation of International Application No. PCT/KR2020/013789, filed on Oct. 8, 2020, which claims priority to Korean Patent Application No. 10-2019-0126017 filed on Oct. 11, 2019 in the Korean Intellectual Property Office, the disclosures of which are herein incorporated by reference.

BACKGROUND

Technical Field

One or more embodiments of the instant disclosure generally relate to an electronic device that may provide millimeter wave communication and a mount member capable of fixing the electronic device.

Description of Related Art

As mobile communication technology has evolved, multi-functional portable terminals have become commonplace and, to meet increasing demand for radio traffic, vigorous efforts are underway to develop 5G communication systems. To achieve higher data transmission rate, 5G communication systems are being implemented on ultra-high frequency bands as well as those used for 3G and long-term evolution (LTE).

To implement 5G communication, stand-alone (SA) and non-stand alone (NSA) schemes are taken into consideration. Of the two, the NSA scheme may include an LTE NR-dual connectivity scheme that uses the new radio (NR) system along with the legacy LTE system. In the NSA scheme, user equipment (UE) may use not only eNBs of the LTE system but also gNBs of the NR system.

The 5G communication system may support frequencies of approximately 3 Ghz to 100 Ghz, such as 3.6 GHz, 6 GHz, 24 to 86 GHz, and signals transmitted/received at the frequencies may be referred to as millimeter waves (mm-Wave).

SUMMARY

Compared to conventional 4G communication system, millimeter wave has a low degree of diffraction and stronger straightness. Due to strong straightness, the communication environment may worsen when an obstacle is located between two electronic devices supporting 5G communication. Accordingly, the cell (or coverage) for supporting 5G communication may be configured to be smaller than the cell supporting conventional 4G communication, and relay devices need to be deployed so that no obstacles can intervene between relays. Further, high degree of alignment between antennas of the relay devices may be required.

To smoothly support 5G communication in a house in which the user resides, the user may be required to self-install a relay device for 5G communication. Simple installation method may lead the user to easily install the relay device for 5G communication outdoors or indoors. As such, when the relay device is installed outdoors or indoors, the installation of the relay device should be made to be stable.

According to an embodiment, there may be provided an electronic device for performing communication with an external electronic device while being coupled with a mount member fixable to a building wall or a window, comprising a housing configured to rotate about a first rotation axis on the mount member, the housing including a first housing; a second housing facing in a direction opposite to the first housing and couplable to the mount member; and a third housing forming a space between the first housing and the second housing; and an antenna module exposed to an outside through at least a portion of the third housing and coupled to the third housing to be rotatable about a second rotation axis; wherein the antenna module is configured to rotate about the first rotation axis and/or the second rotation axis to be aligned with an antenna of the external electronic device.

According to an embodiment, there may be provided an electronic device for performing communication with an external electronic device while being coupled with a mount member fixable to a building wall or a window, comprising a housing configured to rotate about a first rotation axis on the mount member, the housing including a first housing; a second housing facing in a direction opposite to the first housing and couplable to the mount member; and a third housing forming a space between the first housing and the second housing; an antenna module exposed to an outside through at least a portion of the third housing and coupled to the third housing to be rotatable about a second rotation axis; and a connector part having one side detachably coupled the second housing of the electronic device and another side detachably coupled the holder part of the mount member and configured to rotate about the first rotation axis; wherein the antenna module is configured to rotate about the first rotation axis and/or the second rotation axis to be aligned with an antenna of the external electronic device.

According to an embodiment, there may be provided a mount member for fixing an electronic device to a window, comprising a connector part detachably coupled with the electronic device and axially coupled with the electronic device to be configured to rotate about the same rotation axis; a holder part detachably coupled with the connector part and fixed to a building wall or a window; a first arm part extending from the holder part; and second arm parts orthogonal to the first arm part and respectively contacting and fixed to two vertical frames included in the window.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

According to certain embodiments of the disclosure, an electronic device supporting 5G communication may include a housing and at least one antenna module received in the housing and may include a fastening part that may be fastened to a mount member and/or an adjusting part capable of adjusting the orientation of the antenna. Further, according to certain embodiments, the mount member may include a rotating part for rotating the electronic device.

According to certain embodiments of the disclosure, there may be provided an electronic device for communication with an external electronic device for establishing a 5G communication environment.

When provided indoors or outdoors, the electronic device may be stably installed indoors or outdoors using the mount member.

According to certain embodiments, when the sensitivity of communication with an external electronic device is low, the electronic device may identify it and notify the user, guiding the user to set an antenna orientation of the electronic device to more efficiently receive radio waves.

The electronic device uses a universal connector part, which is applicable to various types of mount members corresponding to various shapes.

Figure 1:
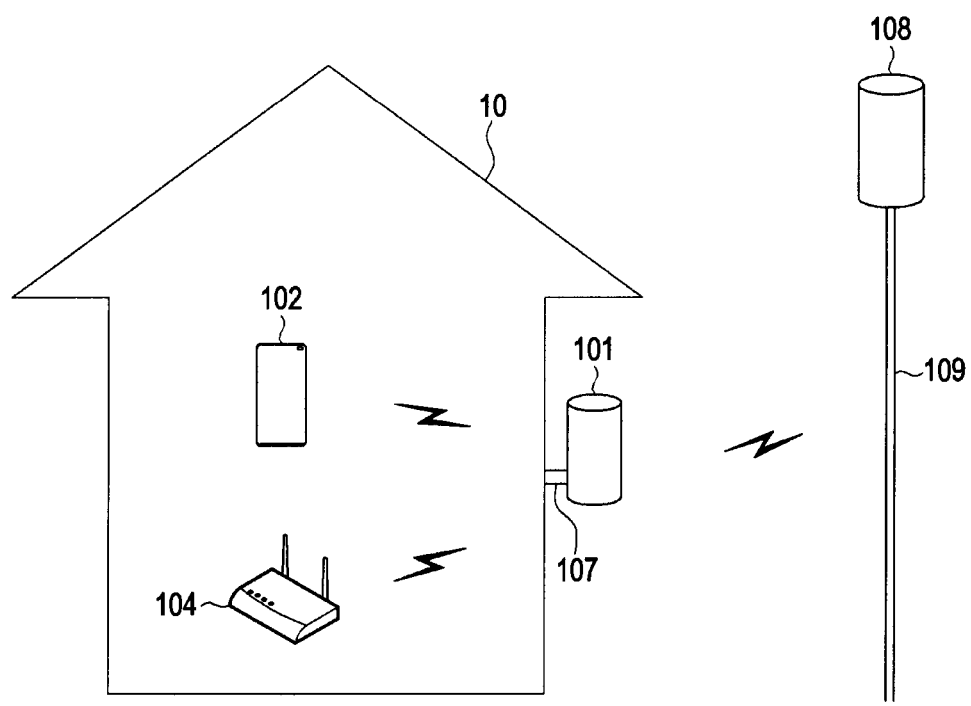
FIG. 1 is a view illustrating placement of an electronic device according to an embodiment.

FIG. 1 is a view illustrating placement of an electronic device according to an embodiment.

According to an embodiment, an electronic device 101 may be disposed inside or outside a building 10. For example, the electronic device 101 may be fixed to at least a portion of an element (e.g., window frame or sill) of a window in the building 10. For example, according to an embodiment, at least a portion of a mount member 107 may be fixed (or attached) to an element of the building 10, and the electronic device 101 may be fixed onto the mount member 107.

According to an embodiment, the electronic device 101 may be referred to as a customer premises equipment (CPE). The CPE may relay data from at least one external electronic device 102 or 104 positioned in the building 10 to another CPE 108 (or a base station) which is another external electronic device. Further, the CPE may relay the data from the other CPE 108 (or base station) to at least one external electronic device 102 or 104. The other CPE 108 may be placed, e.g., on a tall structure 109, but the position of placement or shape of the structure 109 is not limited. The other CPE 108 may also communicate with another CPE or base station. The CPE may also be referred to as a relay device or a router.

The electronic device 101 may provide millimeter wave communication and, as described above, the millimeter wave may have strong straightness. Accordingly, when the electronic device 101 is positioned inside the building 10, smooth communication with the CPE 108 (or a base station) may be difficult. For example, there is a possibility that the millimeter wave from the electronic device 101 is blocked by the wall of the building 10. Accordingly, when the electronic device 101 is positioned outside the building 10, millimeter wave communication may be smoothly performed. The electronic device 101 is positioned outside the building 10 and may relay data of at least one external electronic device 102 and 104 in the building 10 to another external electronic device (e.g., the CPE 108), and thus, it may be referred to as an outdoor CPE. Or, since the electronic device 101 is positioned adjacent to the building 10 in relation to another external electronic device (e.g., the CPE 108), it may be referred to as an indoor CPE relative to the other external electronic device (e.g., the CPE 108).

According to an embodiment, a plurality of electronic devices 101 may be placed inside or outside the building. The other CPE 108 for performing millimeter wave communication has strong straightness and narrow coverage. Thus, for seamless transmission/reception of communication, a plurality of CPEs may be provided inside and outside the building.

According to an embodiment, at least some of the electronic devices 101 may be positioned outside the building 10 or may be positioned in an opening (e.g., window) to the outside. For example, the electronic device 101 may be positioned adjacent to the opening (e.g., window), inside or outside the building 10. Accordingly, the likelihood that an obstacle is to be positioned between the electronic device 101 and the other CPE 108 (or base station) is reduced, so that the communication quality of millimeter wave may be enhanced. Further, as described below, the electronic device 101 may pivot about the mount member 107 and, the antenna of the electronic device 101 may be rotated to be aligned with the antenna of the other CPE 108. Further, the electronic device 101 may include an adjuster capable of adjusting the orientation of the antenna and, as adjusted by the adjuster, the antenna of the electronic device 101 may be aligned with the antenna of the other CPE 108. The user (or installer) of the electronic device 101 may identify the position of the other CPE 108 and/or information about the beam formed by the other CPE 108, through a phone call or another electronic device (e.g., a smartphone). The user may adjust the position of the electronic device 101 (or mount member 107) and the orientation of the electronic device 101 based on the identified information. For example, the user may obtain information about the position of the CPE (e.g., the other CPE 108) positioned near the building 10 by placing a phone call through the CPE 108. Or, the other electronic device (e.g., smartphone) may execute an application for CPE search. The other electronic device 101 may obtain information about the position of the CPE (e.g., the other CPE 108) positioned around the other electronic device based on the current position of the other electronic device. The other electronic device may display, e.g., information about the nearby CEP and/or information about the millimeter wave (e.g., beamformed wave) generated from the nearby CPE. The user may determine the fixed position and initial orientation of the electronic device 101 by identifying the corresponding information. Later, the user may perform fine adjustment (e.g., pivot and/or adjust the antenna orientation) from the initial orientation.

According to an embodiment, the electronic device 101 may include an output device (e.g., an LED indicator). The electronic device 101 may receive a communication signal from the other CPE 108 (or base station). The electronic device 101 determines the quality of the communication environment of the electronic device 101 based on the characteristics of the communication signal (e.g., at least one of reference signal received power (RSRP), reference signal received quality (RSRQ), reception signal strength indicator (RSSI), or signal to noise ratio (SNR)). The output device may be controlled to output information about the quality of the communication environment of the electronic device 101. For example, when it is identified that the quality of the communication environment of the electronic device 101 is good, the LED indicator may output light of a first color (e.g., green or blue). For example, if it is identified that the quality of the communication environment of the electronic device 101 is poor, the LED indicator may output light of a second color (e.g., red). The user may pivot the electronic device 101 or adjust the orientation of the antenna until light of the first color is output.

Figure 2:
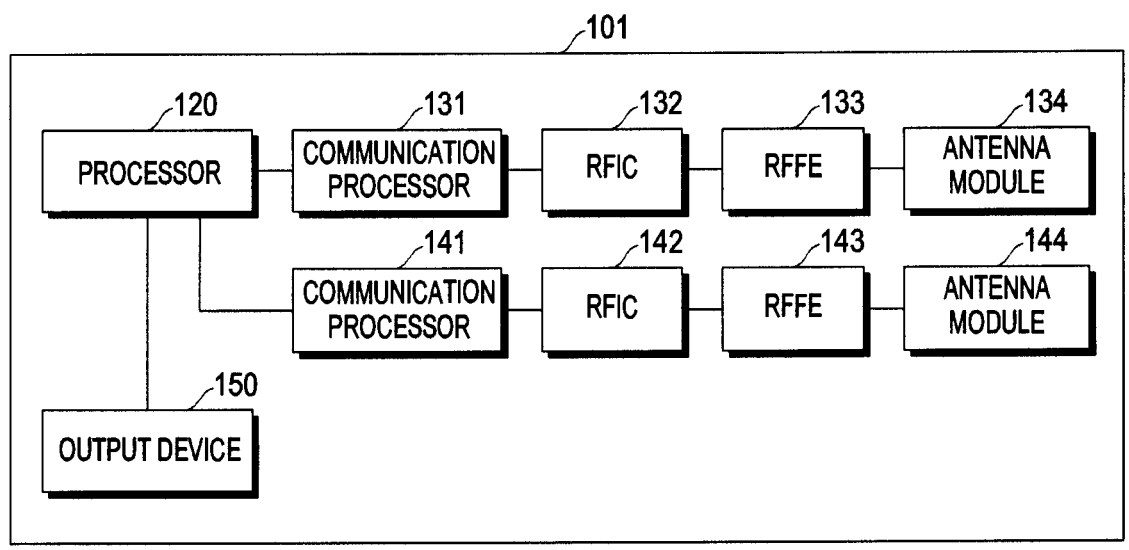
FIG. 2 is a block diagram illustrating an electronic device according to an embodiment.

FIG. 2 is a block diagram illustrating an electronic device according to an embodiment.

According to an embodiment, the electronic device 101 may include at least one of a processor 120, a communication processor 131, a radio frequency integrated circuit (RFIC) 132, a radio frequency front end (RFFE) 133, an antenna module 134, a communication processor 141, an RFIC 142, an RFFE 143, an antenna module 144, or an output device 150.

According to an embodiment, the processor 120 may execute, e.g., software (e.g., program) to control at least one other component (e.g., a hardware or software component) of the electronic device 101 connected with the processor 120 and may process or compute various data. According to one embodiment, as at least part of the data processing or computation, the processor 120 may load a command or data received from another component in a volatile memory (not shown), process the command or the data stored in the volatile memory (not shown), and store resulting data in a non-volatile memory (not shown). According to an embodiment, the processor 120 may include a main processor (e.g., a central processing unit (CPU) or an application processor (AP)), and an auxiliary processor (e.g., a graphics processing unit (GPU), an image signal processor (ISP), a sensor hub processor, or a communication processor (CP)) that is operable independently from, or in conjunction with, the main processor. Additionally or alternatively, the auxiliary processor may be adapted to consume less power than the main processor, or to be specific to a specified function. The auxiliary processor may be implemented as separate from, or as part of the main processor. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the communication processor 131 may establish a communication channel corresponding to a designated band (e.g., from about 6 GHz to about 60 GHz) or may support fifth generation (5G) network communication via the established communication channel. Upon transmission, the RFIC 132 may convert a baseband signal generated by the communication processor 131 into an RF signal used in the 5G network. Upon reception, a 5G RF signal may be obtained via the antenna module 134 and may be pre-processed through the RFFE 133. The RFIC 132 may convert the pre-processed 5G RF signal into a baseband signal that may be processed by the communication processor 131. The RFFE 133 may perform amplification and/or filtering on the RF signal and may also perform antenna tuning and power tracking. The antenna module 134 may include a plurality of antenna elements, which may also be called an antenna array. A beamformed RF wave may be formed by the plurality of antenna elements. The RFIC 132 and/or the RFFE 133 may include a plurality of phase shifters corresponding to the plurality of antenna elements. Upon transmission, the plurality of phase shifters may change the phase of the 5G RF signal which is to be transmitted to the outside (e.g., 5G network base station) of the electronic device 101 via their respective corresponding antenna elements. Upon receipt, the plurality of phase shifters may change the phase of the 5G RF signal received from the outside to the same or substantially the same phase via their respective corresponding antenna elements. This enables transmission or reception via beamforming between the electronic device 101 and the outside. According to another embodiments, the communication processor 141, the RFIC 142, the RFFE 143, and the antenna module 144 of the electronic device 101 may provide WI-FI communication. Although not shown, the electronic device 101 may further include a communication processor, an RFIC, an RFFE, and an antenna module for a legacy network (e.g., 4G network). For example, the electronic device 101 may provide 4G communication in addition to 5G communication and, in this case, it may further include a communication processor, an RFIC, an RFFE, and an antenna module for 4G communication.

According to an embodiment, the electronic device 101 (e.g., the processor 120 and/or the communication processor 131) may identify the characteristics of the communication signal (e.g., at least one of RSRP, RSRQ, RSSI, or SNR) from the other CPE 108 (or base station). The electronic device 101 may control the output device 150 to output information based on the identified characteristics. For example, when the identified RSSI exceeds a designated value, the electronic device 101 may control the output device 150 to output information indicating that the communication environment is good. In another example, when the identified RSSI is less than or equal to the designated value, the electronic device 101 may control the output device 150 to output information indicating that the quality of the communication environment is poor. For example, when the output device 150 is an LED indicator, the electronic device 101 may control the output device 150 to output light of different colors based on information corresponding to each communication environment. Alternatively, when the output device 150 is implemented as a display, the electronic device 101 may control the output device 150 to display a number, or at least one bar, indicating the communication environment. Accordingly, the user may identify information output from the output device 150 and adjust the orientation of the electronic device 101. Meanwhile, the output device 150 may be implemented as a speaker according to another embodiment. In this case, the electronic device 101 may control the output device 150 to output sounds of different volumes or different patterns based on information corresponding to each communication environment.

According to an embodiment, the electronic device 101 may include a fastening part configured to be fastened to the mount member and/or an adjuster for adjusting the orientation of the antenna included in the antenna module 134, which is described below.

According to an embodiment, the electronic device 101 may perform communication with another external electronic device (e.g., smart phone). The electronic device 101 may transmit information indicating the quality of the communication environment to the external electronic device. The external electronic device (e.g., smart phone) may output the received information, and based thereupon, the user may identify the quality of the communication environment corresponding to the current orientation and may additionally adjust the orientation of the electronic device 101.

Figure 3:
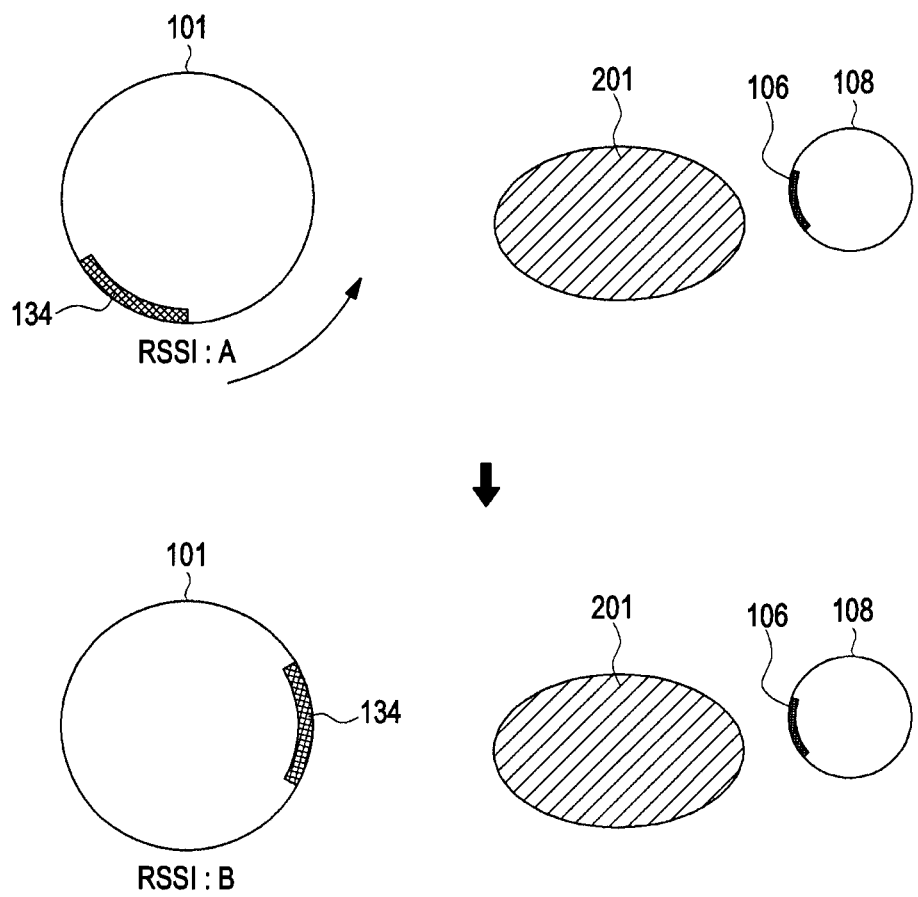
FIG. 3 is a plan view illustrating a beamformed RF wave between an electronic device and another CPE according to an embodiment.

FIG. 3 is a plan view illustrating a beamformed RF wave between an electronic device and another CPE according to an embodiment.

According to an embodiment, the antenna module 134 of the electronic device 101 may be disposed toward a first direction. The antenna module 106 of the other CPE 108 may form a beam-formed RF wave 301. In this case, the electronic device 101 (e.g., the processor 120 and/or the communication processor 131) may identify that the received strength (RSSI) of the communication signal, e.g., beamformed RF wave 301, from the other CPE 108 is A. In this case, if the received strength (RSSI) is identified to be a threshold or less, the electronic device 101 may output, e.g., information indicating that the quality of the communication environment is poor through the output device 150. The user may identify that and adjust the orientation of the electronic device 101. For example, the user may pivot the electronic device 101 about the mount member so that the antenna module 134 of the electronic device 101 may be disposed toward a second direction (e.g., a direction parallel with the Y axis of FIG. 4A described below) different from the first direction (e.g., a direction parallel with the X axis of FIG. 4A described below). The electronic device 101 (e.g., the processor 120 and/or the communication processor 131) may identify that the received strength (RSSI) of the communication signal, e.g., beamformed RF wave 301, from the other CPE 108 is B. In this case, if the received strength (RSSI) is identified to be more than the threshold, the electronic device 101 may output, e.g., information indicating that the quality of the communication environment is good through the output device 150. The user may stop rotating the electronic device 101 and manipulate the electronic device 101 to fix the orientation of the electronic device 101.

According to an embodiment, the electronic device 101 may further include an adjuster capable of adjusting the orientation of the antenna module 134 and, as the adjuster is manipulated by the user, the orientation of the antenna module 134 may be changed. According to the pivot or angle of the electronic device 101, the direction in which the antenna module 134 faces may be changed to a $\varphi$ direction ($\varphi$ in FIG. 4A described below) in the spherical coordinate system. According to the user's manipulation of the adjuster, the direction of the antenna module 134 may be changed to the $\varphi$ direction in the spherical coordinate system.

According to an embodiment, the electronic device 101 may identify whether the pivot of the electronic device 101 is required or the manipulation of the adjuster is required based on the characteristics of the communication signal measured by the antenna module 134. The electronic device 101 may control the output device 150 to output whether pivot is required or manipulation of the adjuster is required. For example, the output device 150 may include two LED indicators, and each LED indicator respectively may output information about whether pivot is required and information about whether manipulation of the adjuster is required.

Figure 4A:
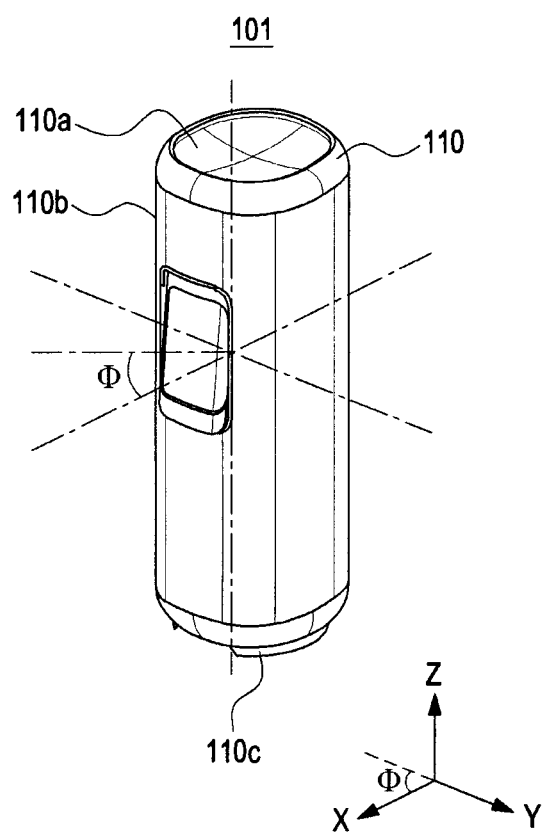
FIG. 4A is a perspective view illustrating an electronic device according to an embodiment.
Figure 4B:
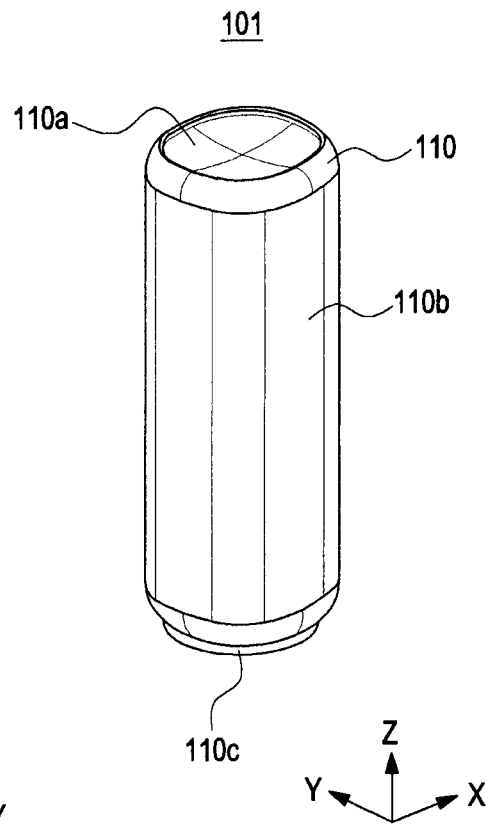
FIG. 4B is a perspective view illustrating the electronic device according to the embodiment shown in FIG. 4A, as viewed in a different direction.

FIG. 4A is a perspective view illustrating an electronic device 101 according to an embodiment. FIG. 4B is a perspective view illustrating the electronic device 101 according to the embodiment shown in FIG. 4A, as viewed in a different direction.

Referring to FIGS. 4A and 4B, the electronic device 101 may include a housing 110 forming the outer appearance of the electronic device 101 and may include an antenna module 134 disposed to be exposed to the outside of the electronic device 101, through at least a portion of the housing 110.

The housing 110 may include an upper housing 110*a* facing in a first direction, a lower housing 110*c* facing in a second direction opposite to the first direction, and a side housing 110*b* connected to the upper housing 110 and the lower housing 110*c* and forming the device's internal space for receiving various electronic components between the upper housing 110 and the lower housing 110*c*. The upper housing 110*a*, the lower housing 110*c*, and the side housing 110*b* may include flat surfaces and/or curved surfaces.

The shape of the housing 110 is not limited to any particular embodiment. For example, although a cylindrical housing 110 elongated and having a curved edge is shown in FIGS. 4A and 4B, the disclosure is not necessarily limited thereto, but other various shapes of housings 110 may be included in certain embodiments of the disclosure.

The antenna module 134 may be disposed to be exposed to the outside of the device through at least a portion of the side housing 110*b*, and the orientation may be changed by the adjuster positioned inside the housing 110.

Figure 5:
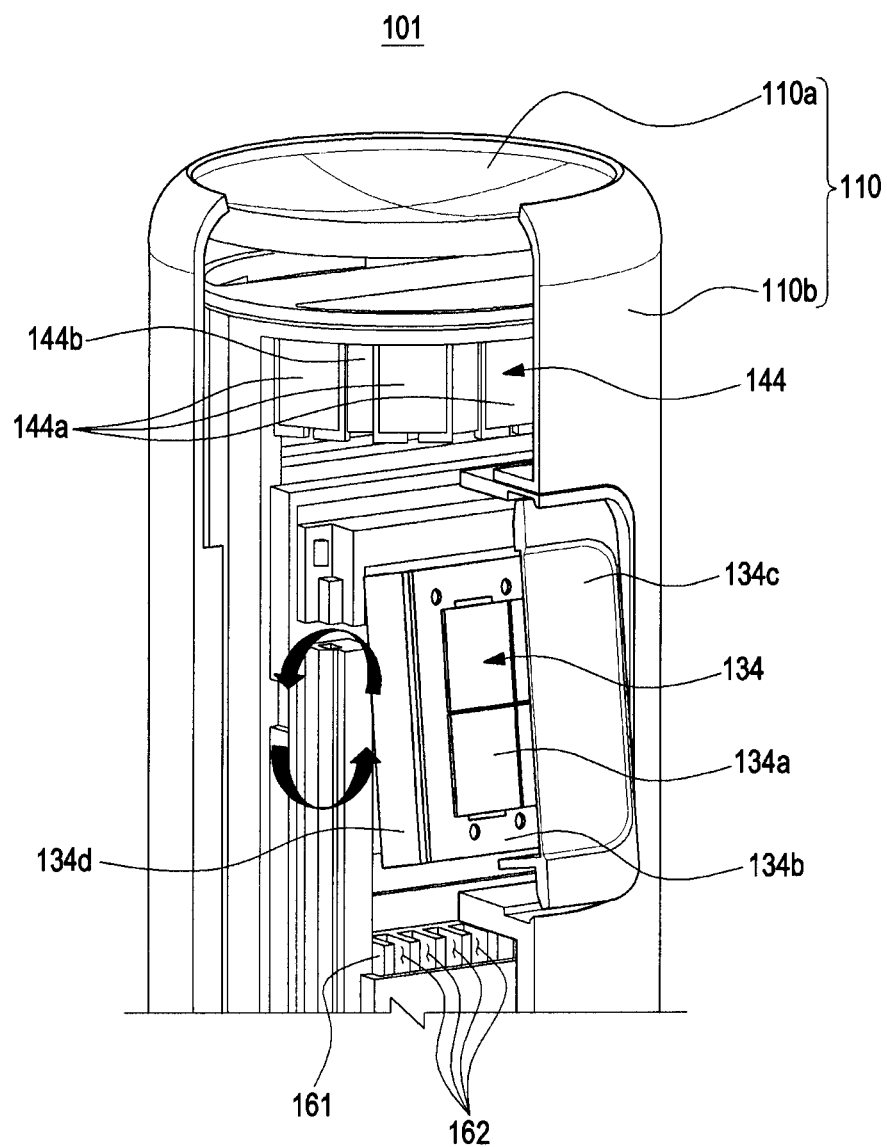
FIG. 5 is an internal perspective view illustrating electronic components disposed in a housing of an electronic device according to an embodiment.

FIG. 5 is an internal perspective view illustrating electronic components disposed in a housing 110 of an electronic device 101 according to an embodiment.

Various electronic components may be provided inside the housing 110 of the electronic device 101. For example, the electronic device 101 may include at least one of the processor 120, the communication processor 131, the RFIC 132, the RFFE 133, the antenna module 134, the communication processor 141, the RFIC 142, the RFFE 143, the antenna module 144, or the output device 150, as the electronic components, in the housing 110.

Referring to FIG. 5, as an example, the antenna module 134 (or first antenna module) and another antenna module 144 (or second antenna module) together may be provided inside the housing 110. For example, the antenna module 134 may be disposed to be at least partially exposed to the outside through the side housing 110*b*, and the other antenna module 144 may be disposed in a position adjacent the upper housing 110, inside the housing.

According to an embodiment, the antenna module 134 may include a plurality of antenna patches 134*a* mounted on a substrate 134*b* and may include a cover 134*c* to prevent damage or corrosion to the electronic components from external physical impact or the elements such as snow, rain or other foreign material. The antenna module 134 may further include a base 134*d* supporting the substrate 134*b* and may include a component (adjuster) by which the angle (e.g., φ of FIG. 4A) between the base 134*d* and the ground is adjusted so that the orientation of the antenna module 134 is varied. According to an embodiment, the adjuster is a component for varying the orientation of the antenna module 134 and may be implemented at least partially in the base 134*d* and/or the antenna module 134. The antenna module 134 may be an antenna module supporting 5G communication which has strong straightness and may be disposed to be exposed to the outside through at least a portion of the side housing 110*b*.

According to an embodiment, the antenna module 144 may include a plurality of antenna patches 144*a* mounted on a substrate 144*b*. The antenna module 144 may be spaced apart from the antenna module 134 by a predetermined distance and may include a plurality of antenna patches 144*a* that face in a direction different from that of the antenna patches 134*a* included in the antenna module 134.

According to an embodiment, the electronic device 101 may include an internal structure 161 formed with a plurality of pores 162, which functions as a heat sink for dissipating the heat generated from heat sources (various electronic components) received inside the housing 110.

Figure 6:
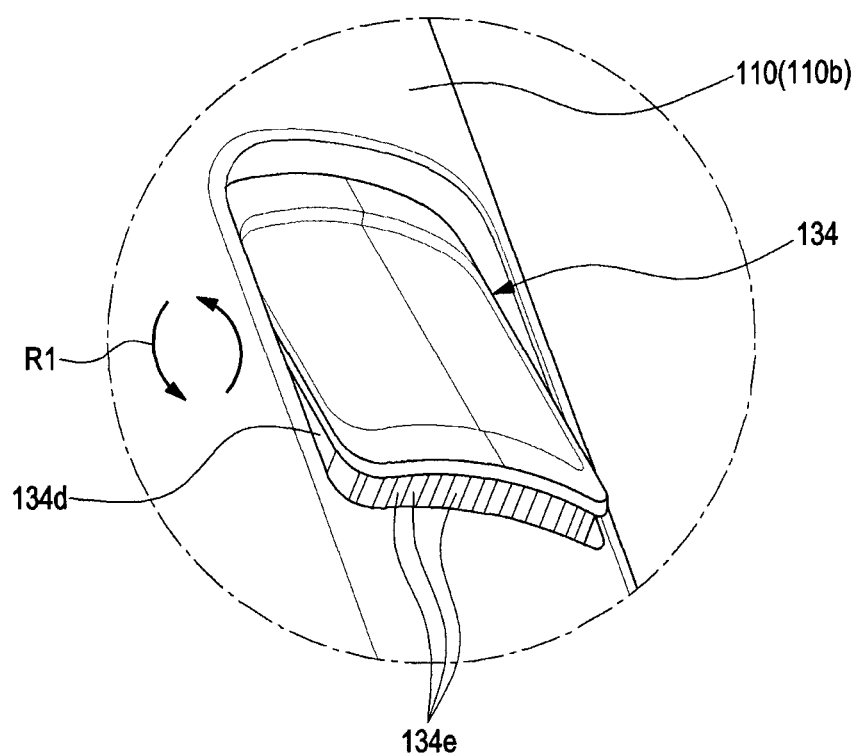
FIG. 6 is a perspective view illustrating an antenna module inclined with respect to a surface of a housing of an electronic device according to an embodiment.

FIG. 6 is a perspective view illustrating an antenna module 134 inclined with respect to a surface of a housing 110 of an electronic device 101 according to an embodiment.

The antenna module 134 may be inclined in the R1 direction (or the φ direction in the spherical coordinate system) at a predetermined angle with respect to the housing 110, e.g., the side housing 110*b*, of the electronic device 101. For example, the antenna module 134 may be inclined by +10 degrees or −10 degrees in the R1 direction (or the φ direction in the spherical coordinate system) from where the antenna module 134 was initially flat or co-planar with respect to the side housing 110*b*. As such, it is possible to adjust the received strength (RSSI) of the communication signal, e.g., the beamformed RF wave 301, from the other CPE 108 by adjusting the orientation of the antenna patches (e.g., the antenna patches 134*a* of FIG. 5) in the antenna module 134.

As the antenna modules 134 and 144 are provided in the electronic device 101, significant heat may be generated. To dissipate the heat inside the electronic device 101, a plurality of pores 134*e* may be formed in the base 134*d* of the antenna module 134. The pores 134*e* formed in the base 134*d* may be formed in positions corresponding to the plurality of pores 162 formed in the internal structure 161 in the electronic device shown in FIG. 5. According to an embodiment, air flowing through the opening O formed in the lower housing 101*c* of the electronic device 101 (shown in FIG. 7C) and several pores 162 in the electronic device 101 may circulate around the antenna module 134 and may also circulate through the plurality of pores 134*e* formed in the base 134*d* of the antenna module 134, thereby dissipating heat for the electronic device. By circulating air in the electronic device 101 through the pores 134*e* and 162, it is possible to increase the lifespan of the electronic components inside the electronic device 101 and to prevent operational errors of the electronic device 101 due to heat generation.

Figure 7A:
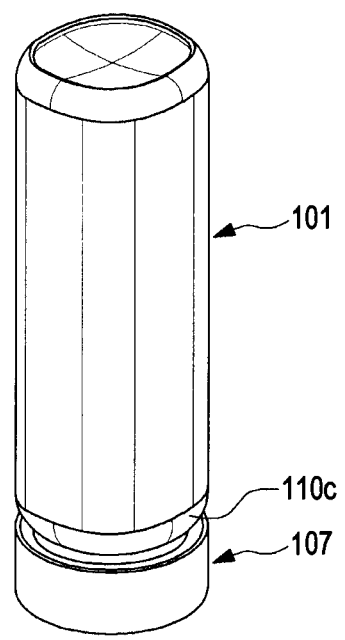
FIG. 7A is a perspective view illustrating an example in which an electronic device and a fixing device are fastened according to an embodiment.
Figure 7B:
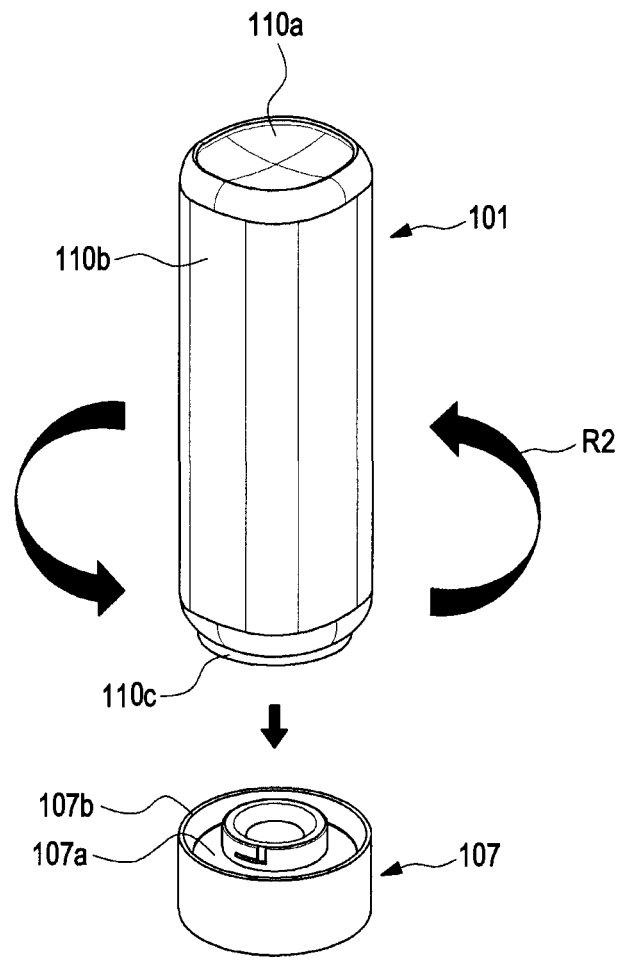
FIG. 7B is a perspective view illustrating an example in which an electronic device and a fixing device are fastened and placed on a shelf of an outer wall of a building according to an embodiment.
Figure 7C:
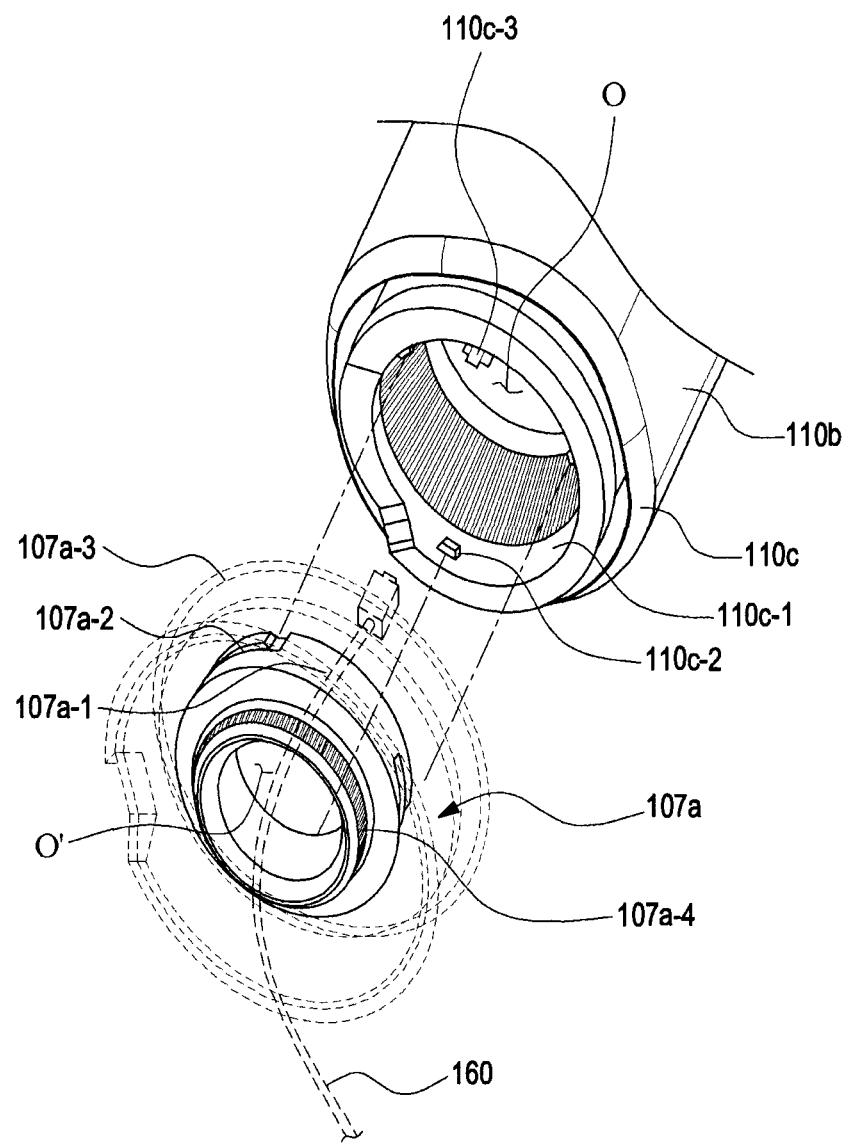
FIG. 7C is a perspective view illustrating an electronic device and a mount member fastened to each other, as viewed at a different angle from that of FIG. 7B.

FIG. 7A is a perspective view illustrating an example in which an electronic device 101 and a mount member 107 are fastened to each other according to an embodiment. FIG. 7B is a perspective view illustrating a process of fastening an electronic device 101 and a mount member 107 according to an embodiment. FIG. 7C is a perspective view illustrating an electronic device 101 and a mount member 107 fastened to each other, as viewed at a different angle from that of FIG. 7B.

Referring to FIGS. 7A and 7B, the electronic device 101 may perform communication with an external electronic device (e.g., the CPE 108 of FIG. 1) while being coupled to the mount member 107. The electronic device 101 may be detachably coupled to the mount member 107.

The mount member 107 may include a connector part 107a detachably coupled with the lower housing 110c of the electronic device 101 and rotatable around the first rotation axis and a holder part 107b detachably coupled with the connector part 107a and fixed to a building outer wall or window.

According to an embodiment, the electronic device 101 may be used while the lower housing 110c is fixed with the connector part 107a of the mount member 107. When the lower housing 110c of the electronic device 101 faces the connector part 107a of the mount member 107, and the connector part 107a is fitted into the lower housing 110c, if rotated in one direction R2, the lower housing 110c of the electronic device 101 may be fastened and fixed to the connector part 107a of the mount member 107.

Referring to FIGS. 7B and 7C, a through hole O may be formed in the lower housing 110c of the electronic device 101, and the connector part 107a of the mount member 107 may be inserted into the through hole O so that the electronic device 101 may be fixedly coupled to the lower housing 110c.

According to an embodiment, the connector part 107a may include a plate 107a-3 and a protrusion 107a-1 projecting from one surface of the plate 107a-3 and having a fastening part 107a-2 formed on the outer circumference to be coupled with the lower housing 110c. Further, the connector part 107a may further include a case disposed under the plate 107a-3 and seated on the holder part 107b and a rotating part 107a-4 for rotating the electronic device 101 around the first rotation axis. The rotating part 107a-4 may be formed in various shapes and may include various internal components. As shown in FIG. 7C, the rotating part 107a-4 may include a component having a threaded outer circumference, or alternatively or additionally, include a component having a threaded inner circumference as the component shown in FIGS. 9B to 9D.

The plate 107a-3 may be a portion contacting at least one end of the lower housing 110c, and the protrusion 107a-1 may project a predetermined distance from the plate 107a-3 and, when the electronic device 101 and the connector part 107a are coupled to each other, the protrusion 107a-1 may be inserted into the through hole O so that it is not visible from the outside.

For more secure coupling between the electronic device 101 and the connector part 107a, at least one fastening part 110c-2 may be provided on the inner circumference 110c-1 of the lower housing 110c of the electronic device 101. Correspondingly, the fastening part 107a-2 may also be formed on the outer circumference of the protrusion 107a-1 of the connector part 107a.

The lower housing 110c of the electronic device 101 has the through hole O that is in fluidic communication with the inside of the electronic device 101. Air for internal heat dissipation of the electronic device 101 may be introduced through the through hole O. A cable 160 for electrically connecting the electronic device 101 with an external electronic device may be connected through the through hole O. Referring to FIG. 7C, the cable 160 inserted through the through hole O of the electronic device 101 and the through hole O' of the connector part 107a may be connected to the cable terminal 110c-3 formed on an internal surface of the electronic device 101.

A more detailed configuration of the connector part 107a including the case and the rotating part is described below.

Figure 8:
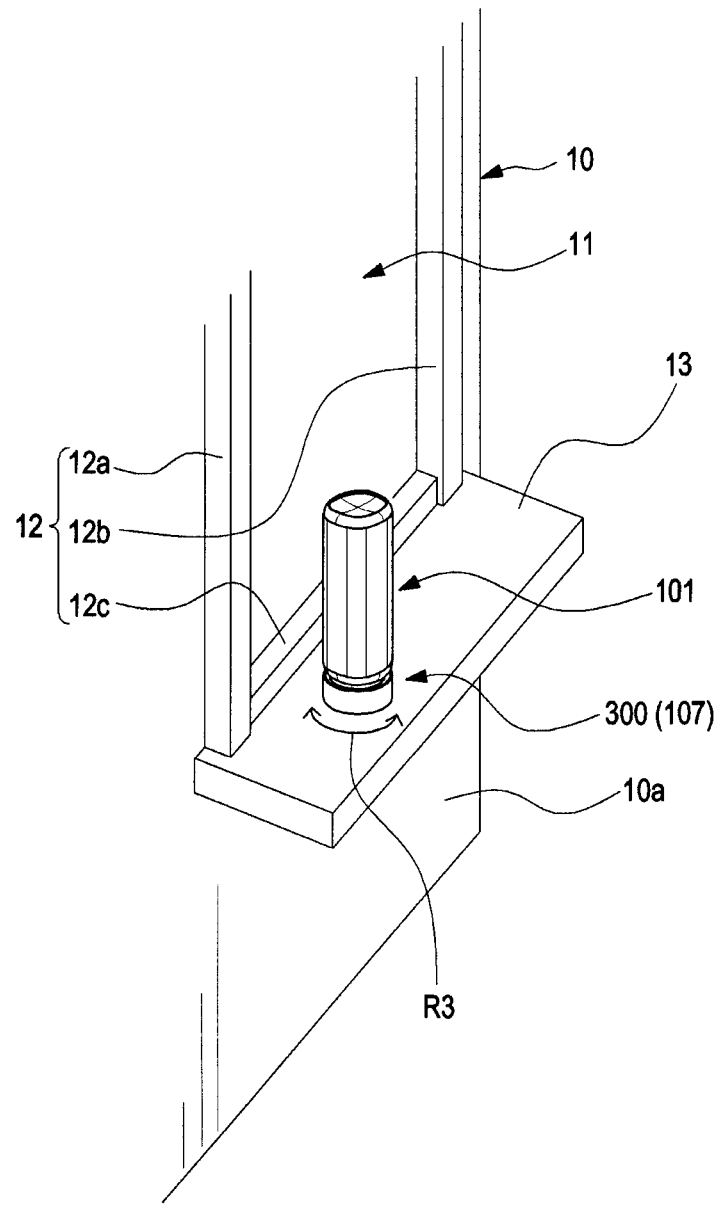
FIG. 8 is a perspective view illustrating an example in which an electronic device and a mount member are fastened and placed on a shelf of an outer wall of a building according to an embodiment.

FIG. 8 is a perspective view illustrating an example in which an electronic device 101 and a mount member 107 are fastened and placed on a shelf 13 of an outer wall of a building 10a according to an embodiment.

5G communication has a lower degree of diffraction and stronger straightness compared to radio waves in the frequency band for 4G communication. Due to strong straightness of 5G communication, the communication environment may worsen when an obstacle is located between two electronic devices supporting 5G communication. Accordingly, to support 5G communication, the electronic device 101 may be provided in a position with fewer obstacles between it and the CPE 108.

Referring to FIG. 8, the lower housing 110c of the electronic device 101 may be fastened to the upper end of the mount member 107. The mount member 107 may be positioned on the outer wall 10a of the building 10 or the window frame 12 or the shelf 13 constituting the window 11. Accordingly, in performing communication with an external electronic device (e.g., another CPE), the position of the electronic device 101 may be stably fixed. Here, the window frame 12 and the shelf 13 may refer to those formed outside or inside the building 10. In the environment in which radio waves received from an external electronic device are not blocked and may pass through the window 11, the electronic device 101 may be disposed outdoors or indoors.

Hereinafter, for convenience of description, the disclosure primarily discusses the case where the electronic device 101 is disposed outdoors.

According to an embodiment, the electronic device 101 may communicate with an external electronic device while being coupled to the mount member 107 that may be fixed to an outer wall or window of a building.

As the mount member 107 used herein, according to an embodiment, it may include a stand-type mount member 300. The stand-type mount member 300 may be fixed while being placed on the shelf 13 extending from the window 11. According to an embodiment, the stand-type mount member 300 may have an adhesive provided on the lower surface thereof and may be immovably fixed onto the shelf 13 by the adhesive.

The electronic device 101 may be pivoted in one direction R3 while the electronic device 101 is mounted on the stand-type mount member 300. In this case, the connector part 107a may be rotated together with the electronic device 101 while the holder part 107b of the mount member 300 is fixed in position. Here, the central axis on which the connector part 107a and the electronic device 101 rotate may be referred to as a 'first rotation axis'. According to an embodiment, the electronic device 101 may be angle-adjusted along the R3 direction (e.g., all 360 degrees) on the first rotation axis with respect to the holder part 107b while being fixedly coupled with the connector part 107a.

Figure 9A:
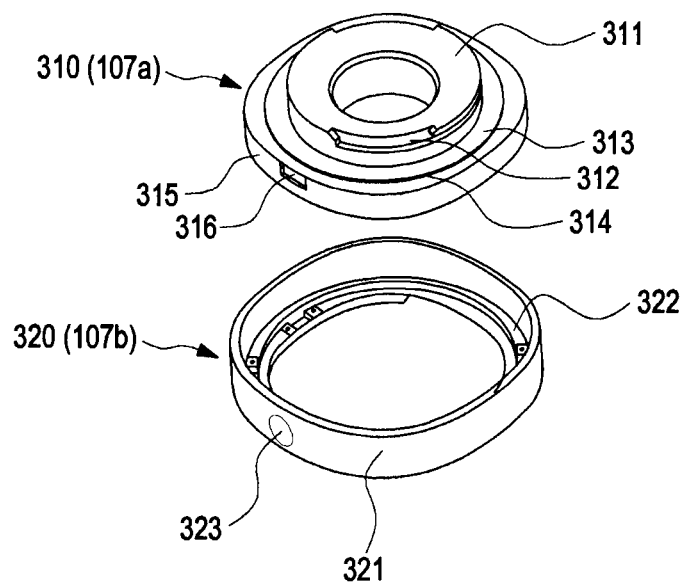
FIG. 9A is an exploded perspective view illustrating a mount member according to an embodiment.
Figure 9B:
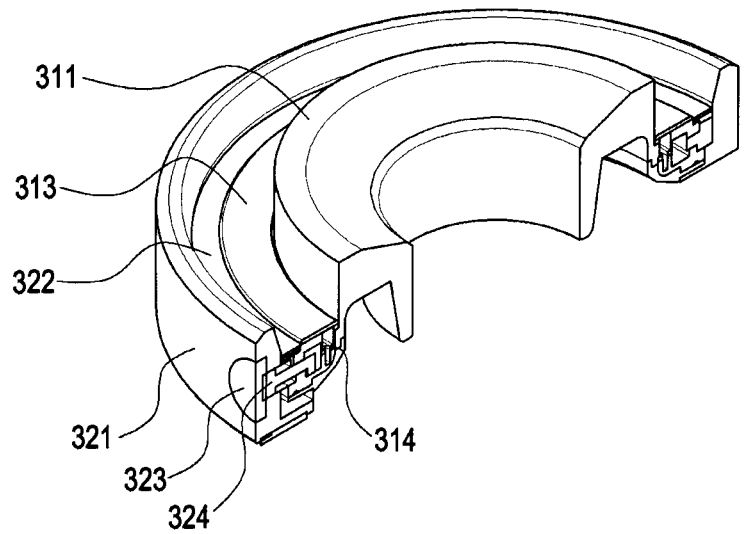
FIG. 9B is a cross-sectional, perspective view illustrating a cross section of a portion of the mount member according to the embodiment shown in FIG. 9A.
Figure 9C:
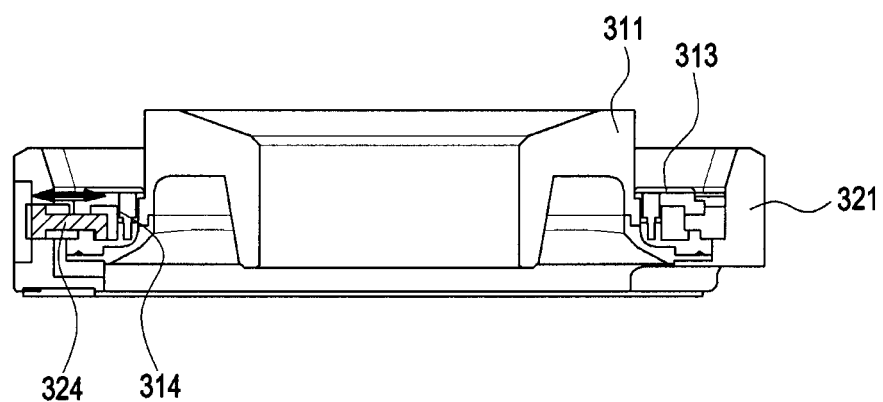
FIG. 9C is a cross-sectional view illustrating a cross section of a portion of the mount member according to the embodiment shown in FIG. 9A.

FIG. 9A is an exploded perspective view illustrating a mount member 300 according to an embodiment. FIG. 9B is a cross-sectional, perspective view illustrating a cross section of a portion of the mount member 300 according to the embodiment shown in FIG. 9A. FIG. 9C is a cross-sectional view illustrating a cross section of a portion of the mount member 300 according to the embodiment shown in FIG.

Figure 9D:
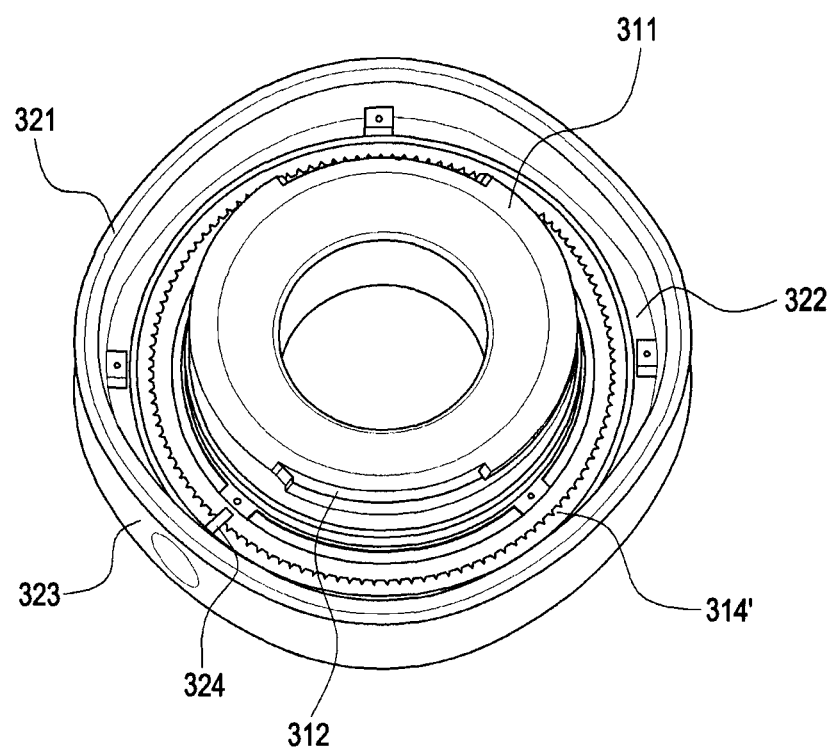
FIG. 9D is a perspective view illustrating an inside of a mount member to show a rotating part disposed in a connector part.

9A. FIG. 9D is a perspective view illustrating an inside of a mount member to show a rotating part disposed in a connector part.

Referring to FIG. 9A, according to an embodiment, the mount member 300 (e.g., the mount member 107 of FIG. 7A) may include a connector part 310 detachably coupled with the electronic device 101 and rotatable about the first rotation axis and a holder part 320 detachably coupled with the connector part 310 and fixed to the outer wall or window.

The connector part 310 and holder part 320 according to the embodiment shown in FIG. 9A may correspond to the connector part 107a and holder part 107b according to the embodiment described above in connection with FIG. 7C. No duplicate description thereof is thus given below.

The connector part 310 may include a plate 313 and a protrusion 311 and a fastening part 312 formed on the outer circumference of the protrusion 311 and may include a case 315 (or first case) and a rotating part 314.

The rotating part may be a component that can be used to adjust the angle of the antenna module included in the electronic device 101 while the user aligns the electronic device 101 with respect to the external electronic device after the electronic device 101 is coupled and fixed with the connector part 310. The rotating part 314 may be shaped to have a predetermined thread inside the case 315. Or, according to an embodiment, the rotating part may denote the combination of the predetermined thread and the case 315.

According to an embodiment, the holder part 320 may include a case (or second case) 321 forming the outer appearance of the holder part. As shown in FIG. 8, the case 321 may be a component that is placed on the shelf 13 to fixedly support the electronic device 101 and the connector part 107a. The case 321 may form the outer appearance of the holder part 320 and have a smooth surface on the outside and fastening protrusions for coupling with the connector part on the inside.

Although not shown in detail in the drawings, a predetermined recess may be formed in the outer circumference of the case 315 (or first case), and the fastening protrusion 322 formed on the inner circumference of the holder part 320 may be fitted into the recess.

According to an embodiment, an opening 316 may be provided in a portion of the case 315, and a pin 324 may be inserted to the opening 316 to be hung on the opening 316.

Referring to FIGS. 9A to 9D, according to an embodiment, the fastening of the thread in the rotating part 314 and the pin 324 may be released as the pin 324 inserted into the opening 316 is pressed and advances when the button 323 of the holder part 320 is pressed. The pin 324 is a component that moves the center portion of the mount member 330 and, as the pin 324 advances toward the center of the mount member when the user presses the button 323, the electronic device 101 may be allowed to pivot about the first rotation axis. Further, when the user releases the press on the button 323, the pin 324 may retreat away from the center of the mount member 300 and back to the original position so that the electronic device 101 is stopped from rotating about the center of the first rotation axis.

Referring to the embodiment shown in FIG. 9D, the internal configuration of the rotating part 314 included in the connector part 107a is shown. Thread is formed to surround the rotating part and, in this state, the thread is fitted or unfitted with the pin 324 so that the electronic device 101 is permitted for angular adjustment or is fixed. However, it should be noted that the specific configuration and shape of the rotating part 314 disclosed herein are not limited to such embodiments. As described above in connection with FIG. 7C, for the configuration of the rotating part 314 shown in FIG. 9D, alternatively or additionally, a component with a threaded inner circumference may be included.

According to an embodiment, a detent member may be included inside the mount member 300 (e.g., the rotating part 314) to let the user know that the direction in which the electronic device 101 faces the external electronic device (e.g., the CPE 108) is being adjusted or to let the user more intuitively feel the angular adjustment state, e.g., how much it has rotated, while the electronic device 101 rotates about the first rotation axis. For example, the user may identify whether or how much the electronic device 101 is currently rotating by a frictional sound (e.g., 'ticktock') between the ratchet of the detent member and a stopper while the electronic device 101 rotates about the first rotation axis. According to an embodiment, the detent member may be implemented using the thread and pin 324 provided in the rotating part according to the above-described embodiment or, alternatively or additionally, it may be implemented using a ratchet mechanism different in structure from the thread and pin 324.

Hereinafter, a mount member 107 according to an embodiment different from the above-described embodiments is described with reference to FIGS. 10 to 14.

Figure 10:
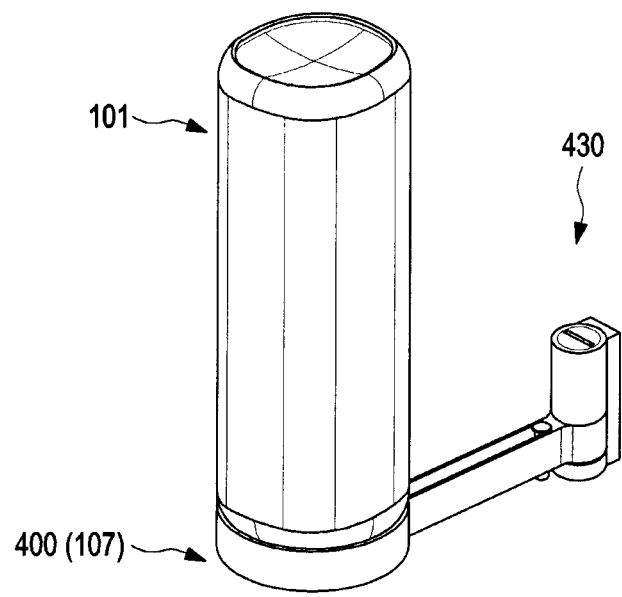
FIG. 10 is a perspective view illustrating an electronic device and a mount member are fastened to each other according to an embodiment.
Figure 11:
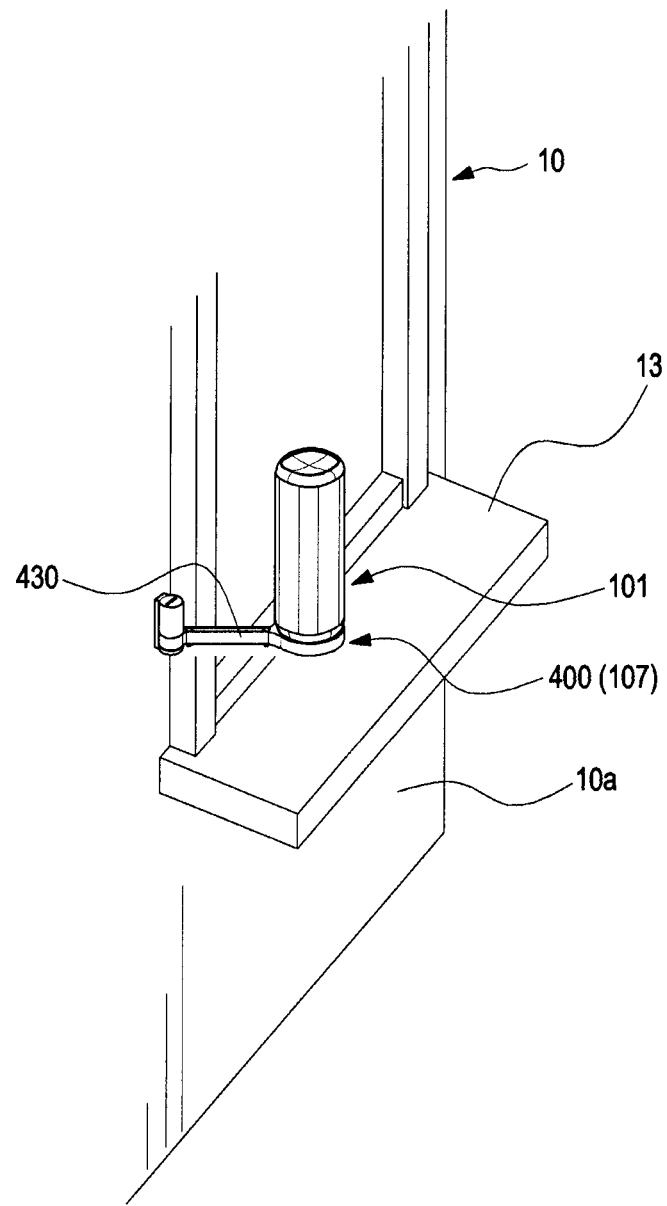
FIG. 11 is a perspective view illustrating an example in which an electronic device and a mount member are fastened and fixed to an outer wall of a building 10a according to an embodiment.
Figure 12:
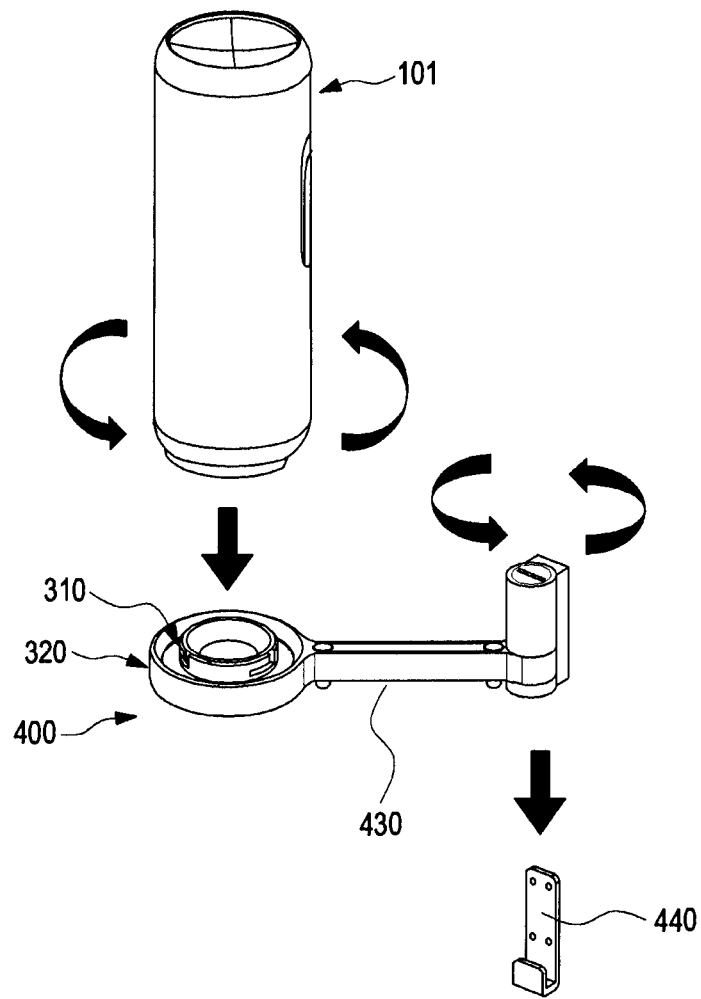
FIG. 12 is a perspective view illustrating a process of fastening an electronic device and a mount member according to an embodiment.

FIG. 10 is a perspective view illustrating an example in which an electronic device 101 and a mount member 400 are fastened to each other according to an embodiment. FIG. 11 is a perspective view illustrating an example in which an electronic device 101 and a mount member 400 are fastened and fixed to an outer wall of a building 10a according to an embodiment. FIG. 12 is a perspective view illustrating a process of fastening an electronic device 101 and a mount member 400 according to an embodiment.

The mount member 107 may include a wall mount-type mount member 400 according to an embodiment. The wall mount-type mount member 400 may be fixed on the outer wall 10a of the building. According to an embodiment, the mounting member 300 may be immovably fixed onto the outer wall using a bracket 440 fixedly installed on the outer wall 10a of the building.

According to an embodiment, the mount member 400 according to the embodiment shown in FIGS. 10 to 12 may include a bracket 440 and a support 432 that are fixedly installed on the outer wall and may include an arm part 431 that extends between the holder part 420 and the support 432 to be rotatable around the support. Here, the arm part 431 and the support 432 may be collectively referred to as a support arm 430.

Although it has been said that the bracket 440 is fixedly installed on the outer wall in the above-described embodiment, it is not necessarily limited thereto, and it should be noted that the bracket 440 may be fixed to the vertical frames 12a and 12b of the window, or other various positions may be implemented.

The support arm 430 may allow the electronic device 101 to be spaced apart from the outer wall by a predetermined distance by using the arm part 431 extending from one side of the holder part 420 to the support 432.

The support 432 may be vertically coupled to the arm part 431 and may have a flat surface facing parallel to at least some outer walls. When the bracket 440 and the support 432 are coupled, as shown in FIG. 12, the flat surface of the support 432 and the bracket 440 may come into contact with each other and be coupled.

Figure 13A:
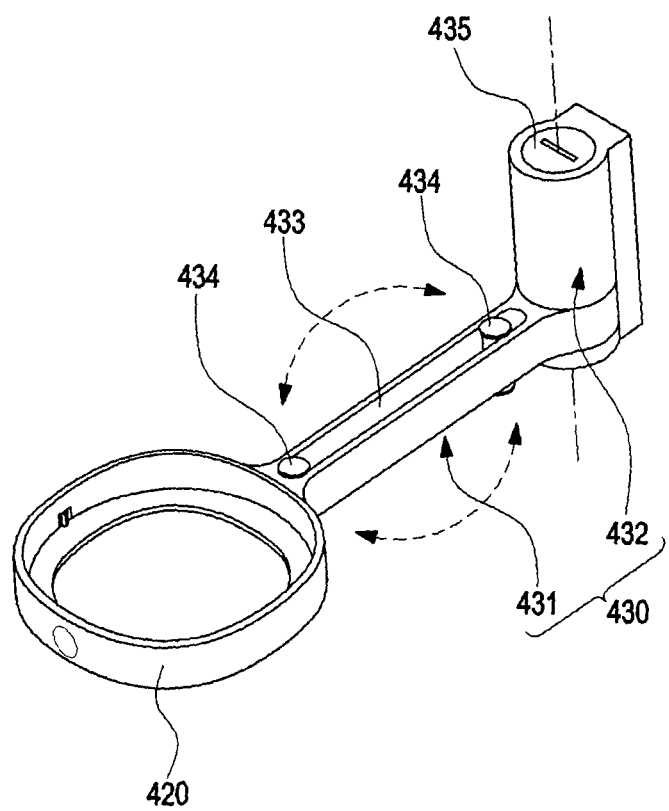
FIG. 13A is a perspective view illustrating an example in which a holder part and arm part of a mount member are rotated about a support.
Figure 13B:
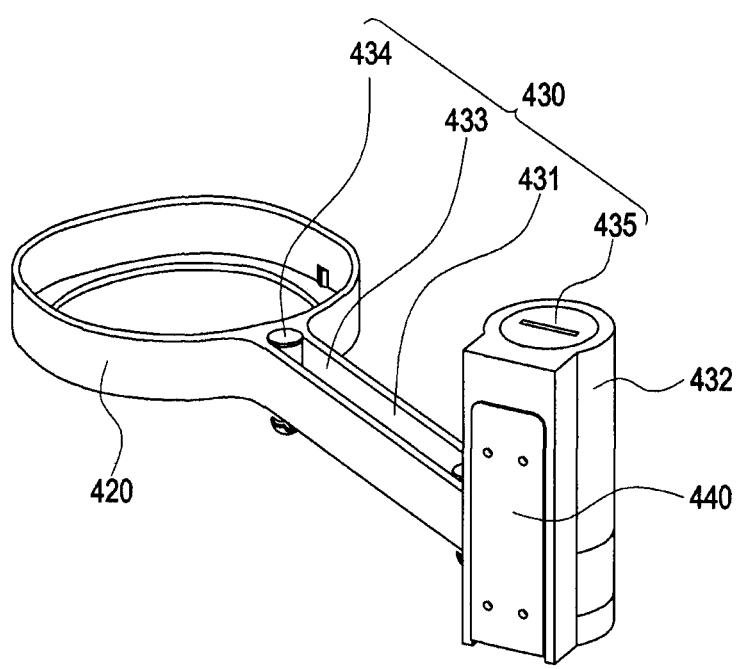
FIG. 13B is a perspective view illustrating a mount member and a bracket for fixing to an outer wall.
Figure 14:
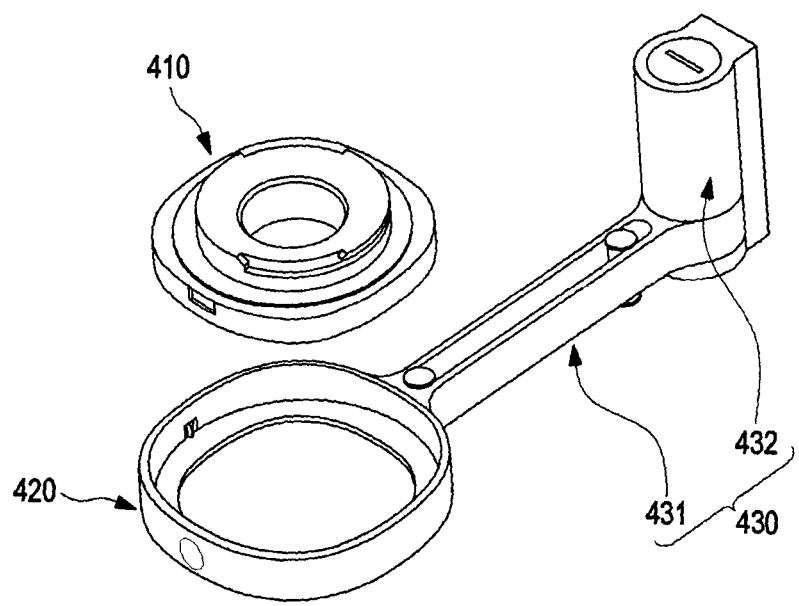
FIG. 14 is a perspective view illustrating an example in which a connector part is coupled to a holder part in a wall mount-type mount member.

FIG. 13A is a perspective view illustrating an example in which a holder part 420 and arm part 430 of a mount member 400 are rotated around a support 435. FIG. 13B is a perspective view illustrating a mount member and a bracket 440 for fixing to an outer wall. FIG. 14 is a perspective view illustrating an example in which a connector part 410 is coupled to a holder part in a wall mount-type mount member.

Referring to FIG. 13A, a slot 433 penetrating from the upper surface to the lower surface of the arm part 431 is formed in the arm part 431, and at least one hanger part 434 may be provided in the slot 433. The hanger part 434 may be a component to prevent the cable connected to the lower surface of the arm part 431 from sagging in the direction of gravity. According to an embodiment, a hook part for hanging and connecting a cable may be formed at the lower end of the hanger part 434.

Referring to FIG. 13B, the bracket 440 is a component to be fixed to the outer wall of the building, alone or in combination with the support 432, and the bracket 440 may be fixed to the outer wall simply using a tightening and/or fixing means, such as screws or bolts.

According to an embodiment, the user may fix the bracket 440 to the building outer wall close to the window and rotate the arm part 431 to turn the electronic device 101 to the window.

FIG. 14 is a view illustrating an example in which a connector part 410 is coupled to a holder part 420 of a mount member 400.

Referring to FIG. 14, in the window mount-type mount member 400, the connector part 410 for coupling with the electronic device 101 may be identical to the connector part 310 according to the embodiment shown in FIGS. 7A to 9D. According to an embodiment, the mount member 400 for fixing the electronic device 101 to a building outer wall or window may be provided with various mount holder parts 420 depending on positions of installation, and the connector part 410 coupled to the holder part may be a general-purpose or universal connector part. For example, according to the embodiment shown in FIG. 9A, the stand-type holder part 320 and connector part 310 are disclosed. According to the embodiment shown in FIG. 14, the wall mount-type holder part 420 and connector part 410 are disclosed. The connector parts 310 and 410 according to the two different embodiments may have substantially the same configuration. Accordingly, the user may interchangeably use mount members with different types of holder parts depending on the installation environment of the building he resides when installing the electronic device 101. In this case, the connector part may be designed to be used, as a single module together with the electronic device, even for different holder parts.

Hereinafter, a mount member 107 according to another embodiment different from the above-described embodiments is described with reference to FIGS. 15 to 20B.

Figure 15:
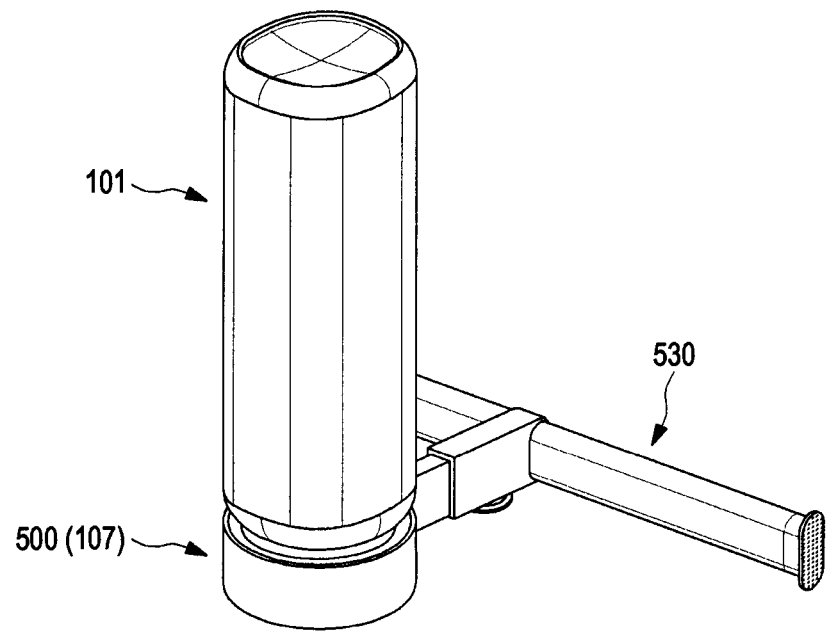
FIG. 15 is a perspective view illustrating an example in which a window mount-type mount member and an electronic device are coupled according to an embodiment.
Figure 16:
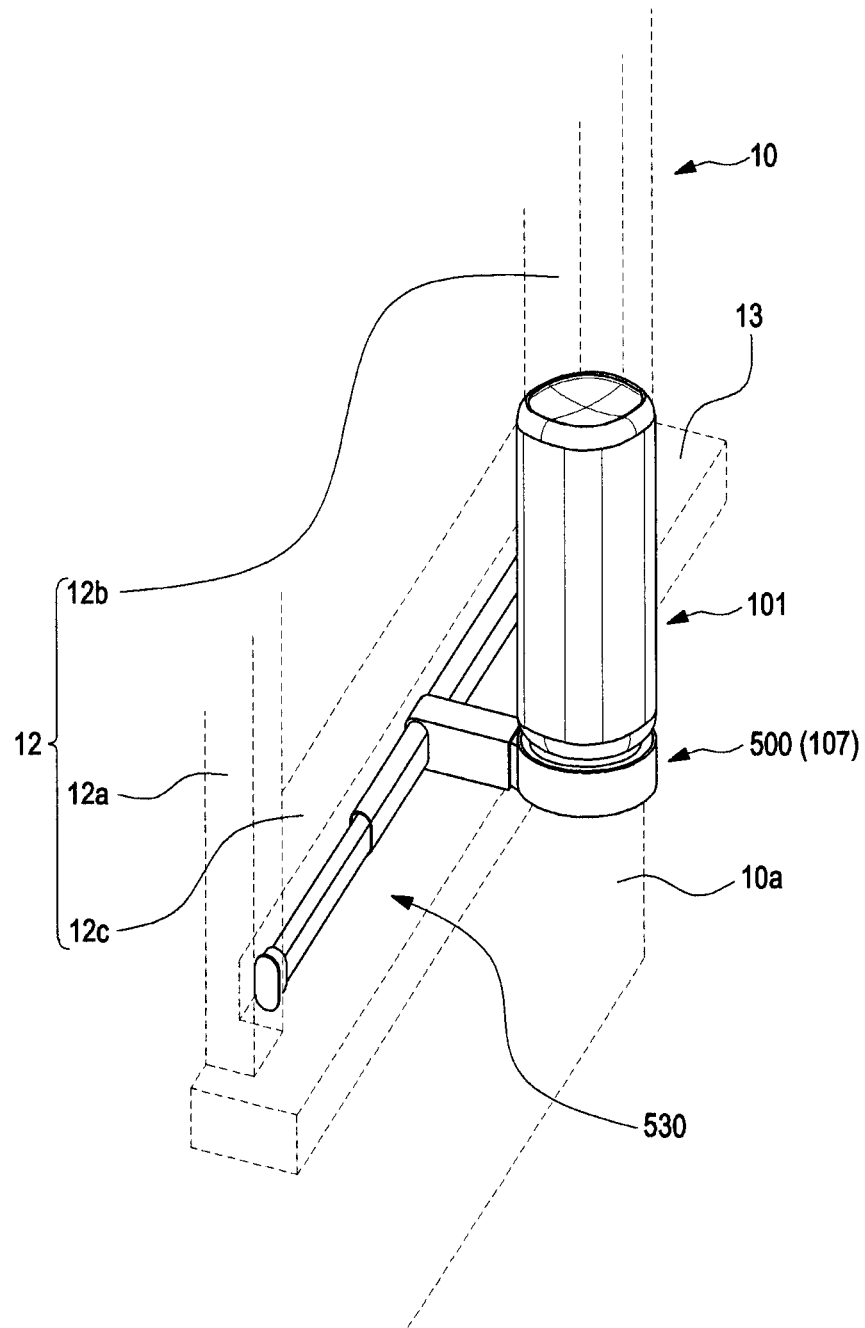
FIG. 16 is a perspective view illustrating an example in which a window mount-type mount member is mounted on a window according to an embodiment.
Figure 17:
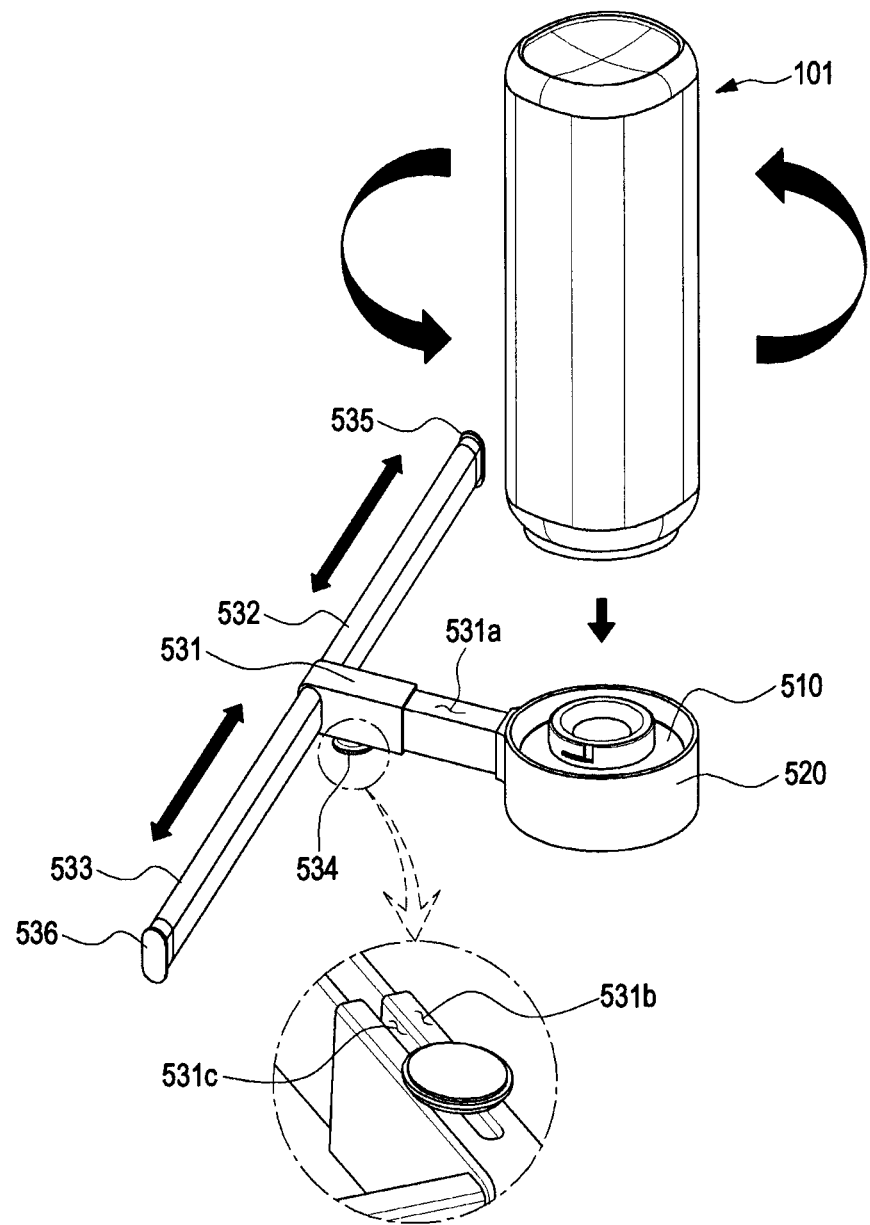
FIG. 17 is a perspective view illustrating a process of fastening an electronic device and a mount member according to an embodiment.
Figure 18:
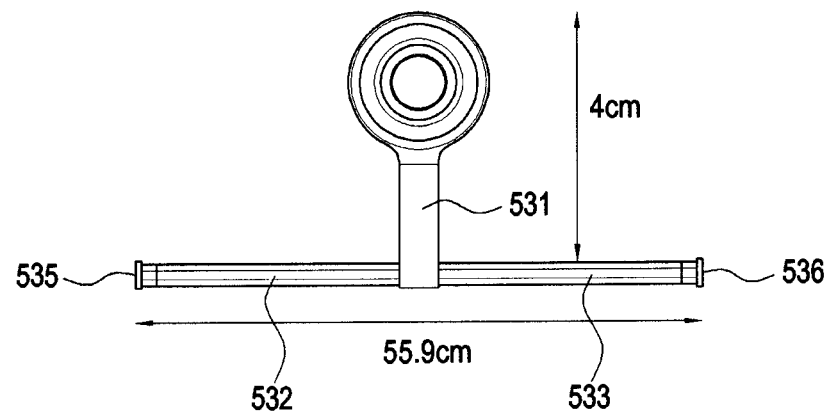
FIG. 18 is a view illustrating an example in which at least one first arm part and a second arm part of a window mount-type mount member extends.
Figure 18:
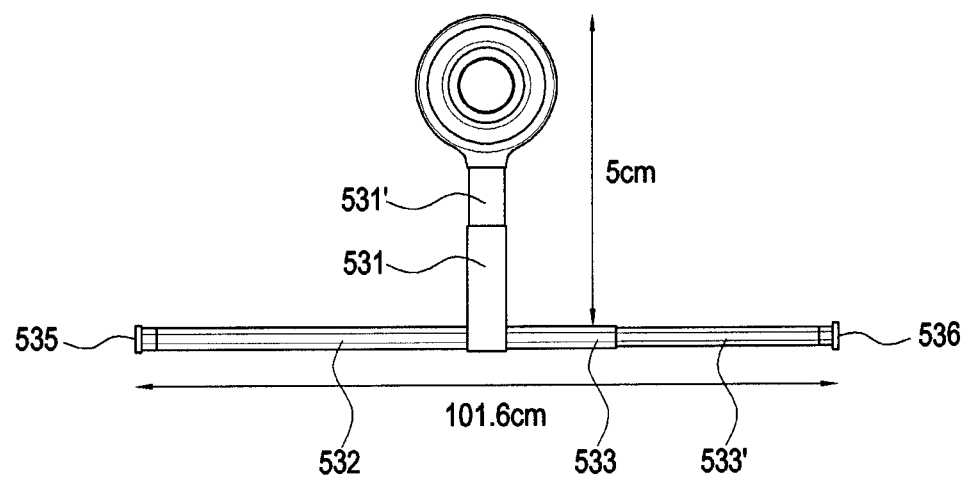

FIG. 15 is a perspective view illustrating an example in which a window mount-type mount member 500 and an electronic device 101 are coupled according to an embodiment. FIG. 16 is a perspective view illustrating an example in which a window mount-type mount member 500 is mounted on a window 12 according to an embodiment. FIG. 17 is a perspective view illustrating a process of fastening an electronic device 101 and a mount member 500 according to an embodiment. FIG. 18 is a view illustrating an example in which at least one first arm part 531 and a second arm part 532 of a window mount-type mount member 500 extends.

The mount member 107 may include a window mount-type mount member 500 according to an embodiment. The window mount-type mount member 500 may be mounted on a window. As compared to the above-described embodiment, in the case of the standing type holder part, there is a risk that the electronic device 101 may fall over and be damaged due to strong wind or the like, and it cannot be easily installed when the shelf 13 is short. In the case of the wall mount type holder part, it is fixed to a wall and thus requires use of a tool, such as a drill or screw, and may leave marks on the wall. However, the window mount-type mount member 500 may be used although the shelf 13 is short and may advantageously leave no marks on the wall.

The mount member 500 may include a first arm part 531 extending from the holder part 520 and second arm parts 532 and 533 orthogonal to the first arm 531 and contactingly fixed to two vertical frames 12a and 12b included in the window 11.

The first arm part 531 may be a component that extends from the holder part 520 and is supported by the second arm parts 532 and 533. The first arm part 531 is shaped to be supported by the second arm parts 532 and 533 and may be disposed apart from the window 11 and shelf 13 by a predetermined distance.

The second arm parts 532 and 533 are supported from the building and, according to an embodiment, the second arm parts 532 and 533 may be referred to as a 2-1th arm part 532 and a 2-2th arm part 533 with respect to where they are coupled with the first arm part 531. The 2-1th arm part 532 and the 2-2th arm part 533 may be shaped to be elongated in directions away from where they are coupled with the first arm part 531. An end of the 2-1th arm part 532 may be coupled with a first tightening part 535, and an end of the 2-2th arm part 533 may be coupled with a second tightening part 536. The first tightening part 535 and the second tightening part 536 may include suction material to suction to the window frame 12 of the window 11.

At least one of the first arm part 531 and the second arm parts 532 and 533, respectively, may further include extensions 531', 532', and 533' which extend in the lengthwise directions of the first arm part 531 and the second arm parts 532 and 533.

For example, according to the embodiment shown in FIG. 18, the mount member may include an extension 531' that extends from the first arm part 531 and an extension 533' that extends from the 2-2th arm part 533 of the second arm parts 532 and 533. The extensions 531' and 533' may be received inside their respective arm parts 531 and 533' and be exposed to the outside by the user's manipulation, thereby increasing the entire length of the arm part. As such, according to certain embodiments of the disclosure, it is possible to provide the mount member 500 that may securely fix and install the electronic device 101 to fit various sizes of the frame 12 of the window 11.

Hereinafter, a method for installing the mount member 500 on the frame 12 of the window 11 is described with reference to FIGS. 19A to 19D.

Figure 19A:
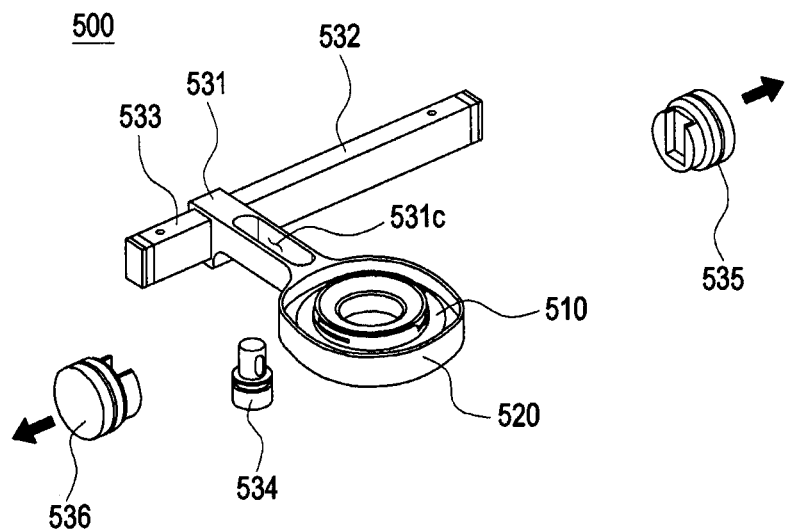
FIG. 19A is a perspective view illustrating an example in which components of a window mount-type mount member are separated.
Figure 19B:
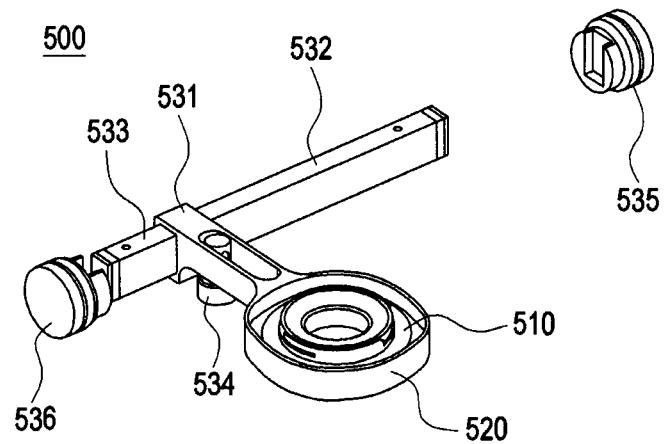
FIG. 19B is a perspective view illustrating an example in which a base is coupled to a first arm part.
Figure 19C:
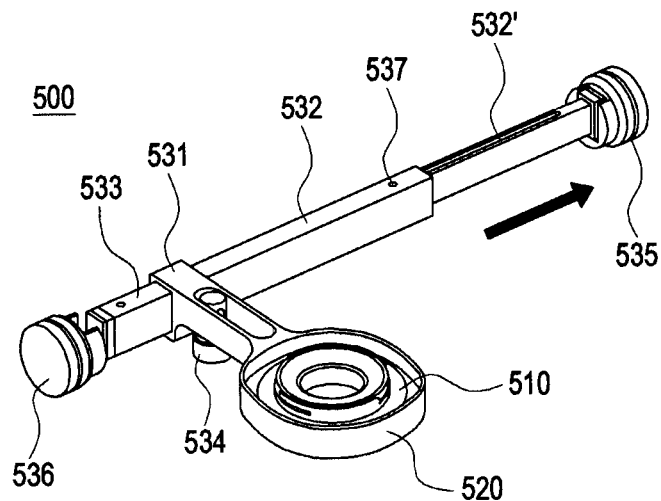
FIG. 19C is a perspective view illustrating an example in which an end of a second arm part extends.
Figure 19D:
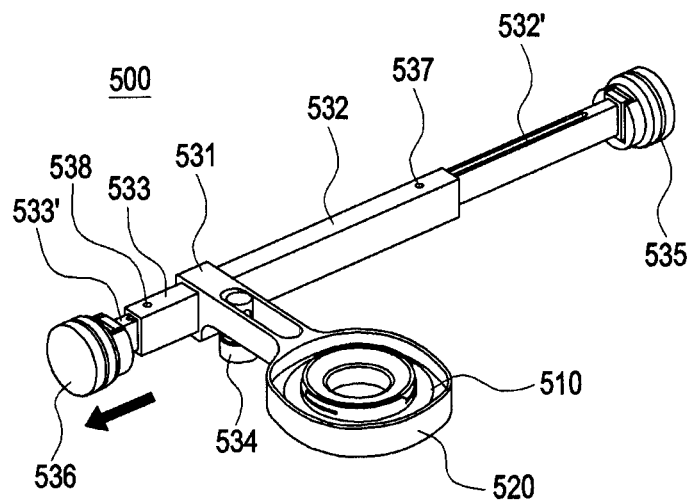
FIG. 19D is a perspective view illustrating an example in which another end of the second arm part extends.

FIG. 19A is a perspective view illustrating an example in which components of a window mount-type mount member 500 are separated. FIG. 19B is a perspective view illustrating an example in which a base 534 is coupled to a first arm part 531. FIG. 19C is a perspective view illustrating an example in which one end of a second arm part 532 and 533 extends. FIG. 19D is a perspective view illustrating an example in which the other end of the second arm part 532 and 533 extends.

According to an embodiment, the mount member 500 may include a connector part 510; a holder part 520 where the connector part 510 is seated, a first arm part 531 extending from the holder part 520 in one direction, and a second arm part 532 and 533 orthogonal to the first arm part 531 and having extensions that are extendable to one side and the other side, respectively. Here, the holder part 520 may support the connector part 510 while being spaced apart from the building outer wall or window or the shelf.

According to an embodiment, the mount member 500 may further include a base 534. The base 534 may be a component that is fitted into a hole 531c formed to pass through the upper surface 531a and the lower surface 531b of the first arm part 531 and supports the lower portion of the first arm part 531 against the shelf 13. When the base 534 is included, the window mount-type mount member 500 may have more stability. According to an embodiment, the base 534 may be shaped to plug into the first arm part 531. Further, the base 534 may prevent the first arm part 531 from tilting and may also play a role to adjust the height of the window mount-type mount member 500.

A method for assembling the mount member 500 is described. The user places the first arm part 531 connected with the holder part 520 in an approximate position on the shelf 13 of the window 11 and brings at least one of the first tightening part 535 (or suction part) and the second tightening part 536 in tight contact with the frame 12, takes out the extension 532' or 533' from any one end of the second arm part 532 and 533, and then inserts it to the tightening part 535 and/or 536 in tight contact with the frame 12. The user then draws out the other extension from the other end of the second arm part 532 and 533 and inserts it to the tightening part in tight contact with the frame 12, thereby mounting the mount member 500 on the window 11.

Although FIGS. 19A to 19D shows an embodiment in which the 2-1th arm part 532 is longer than the 2-2th arm part 533, and tightening using the 2-1th arm part 532 and the first tightening part 535 precedes tightening using the 2-2th arm part 533 and the second tightening part 536, the order is not limited.

Adjustment holes 537 and 538 may be provided in the respective sides of the 2-1th arm part 532 and the 2-2th arm part 533, respectively, to draw out the extensions 532' and 533'. The user may draw out, or back in and fix, the extensions 532' and 533' using a small tool, e.g., a hexagon wrench, on the adjustment holes 537 and 538.

Use of the window mount-type mount member 500 may stably fix the electronic device 101 on the window even without boring the outer wall and fixing or using an adhesive and may provide a stable operational environment in adjusting the position of the electronic device 101 to perform communication with an external electronic device (e.g., the CPE 108).

Figure 20A:
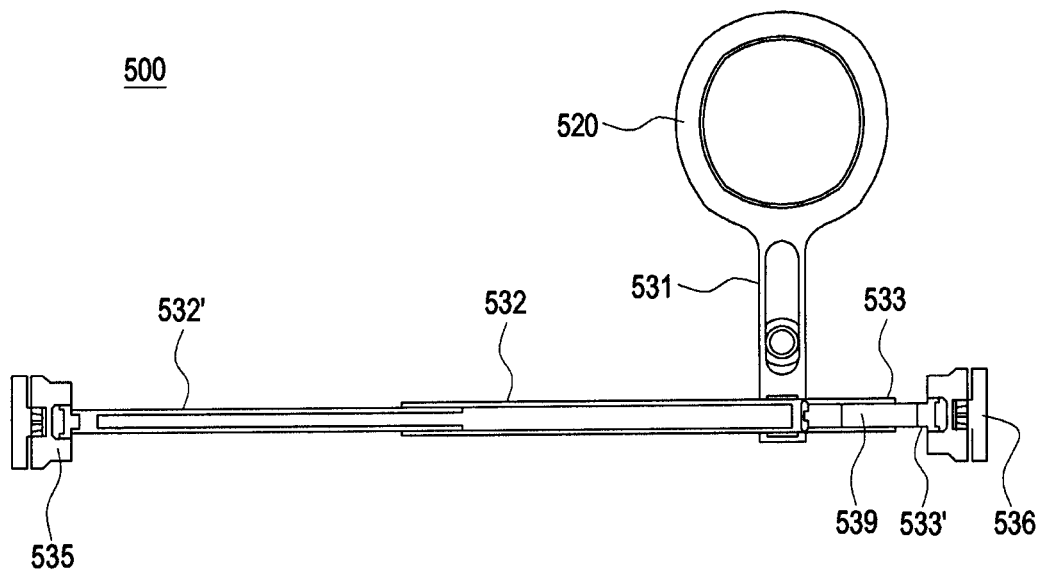
FIG. 20A is a top plan view of a window mount-type mount member.
Figure 20B:
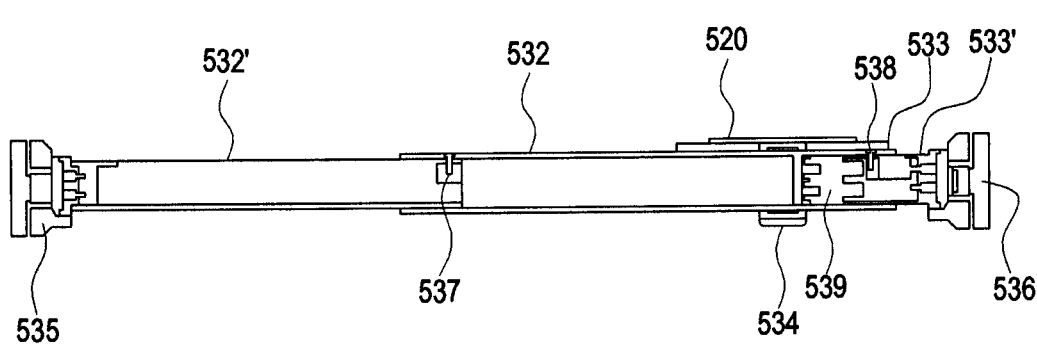
FIG. 20B is a front plan view of a window mount-type mount member.

FIG. 20A is a top plan view of a window mount-type mount member 500 as. FIG. 20B is a front plan view of a window mount-type mount member 500.

According to an embodiment, an end of at least one of the second arm parts 532 and 533 may include an extension 532' or 533' that is extendable in the lengthwise direction, and an elastic body 539 may be included in at least one of the second arm parts 532 and 533.

According to the embodiment shown in FIGS. 20A and 20B, the elastic body 539 may be provided in an inner space formed by the extension 533' and the 2-2th arm part 533 of the second arm parts 532 and 533. According to an embodiment, when the second arm parts 532 and 533 are fixedly coupled to the vertical frames included in the window 12 by the elastic repulsive force of the elastic body 539, they may be fitted between the vertical frames and form a more secure fixing structure.

For example, if the user draws out the extension 532' by unscrewing the adjuster 537 using a hexagon wrench on the 2-1th arm part 532, insert it to the first tightening part 535, and then unscrews the adjuster 538 using the hexagon wrench on the 2-2th arm part 533, the extension 533' may be strongly brought in tight contact with the second tightening part 536 by the elastic repulsive force of the elastic body 539, so that they may be more securely tightly contacted between the frames 12 of the window 11.

According to certain embodiments of the disclosure, there may be provided an electronic device for communication with an external electronic device for establishing 5G communication.

Further, according to certain embodiments as described above, in providing an electronic device outdoors or indoors using the electronic device 101 and a mount member 300, 400, or 500, the electronic device may be securely installed outdoors or indoors by the mount member.

Further, the electronic device uses a universal connector part, which can be used for various types of mount members corresponding to various shapes.

According to an embodiment of the disclosure, there may be provided an electronic device for performing communication with an external electronic device while being coupled with a mount member fixable to a building wall or a window, comprising a housing configured to rotate about a first rotation axis on the mount member, the housing including a first housing; a second housing facing in a direction opposite to the first housing and couplable to the mount member; and a third housing forming a space between the first housing and the second housing; and an antenna module exposed to an outside through at least a portion of the third housing and coupled to the third housing to be rotatable about a second rotation axis; wherein the antenna module is configured to rotate about the first rotation axis and/or the second rotation axis to be aligned with an antenna of the external electronic device.

According to an embodiment, the antenna module may be configured to support a frequency band of 3 GHz to 100 GHz.

According to an embodiment, the electronic device may further comprise a second antenna module configured to support a frequency range different from that of the antenna module and the electronic device may be configured to relay a signal received from the external electronic device through the antenna module to a third electronic device.

According to an embodiment, the second antenna module may be configured to provide Wi-Fi communication.

According to an embodiment, the electronic device may further comprise a processor configured to determine a quality of a communication environment based on information related to a signal strength based on an angle and/or distance between the electronic device and the external electronic device.

According to an embodiment, the electronic device may further comprise an output device configured to output information about a quality of a communication environment according to the alignment with the antenna of the external electronic device.

According to an embodiment, the electronic device may further comprise a plurality of pores configured to dissipate heat generated from the antenna module.

According to an embodiment, the mount member may include a connector part detachably coupled with the second housing of the electronic device and rotatable about the first rotation axis; and a holder part detachably coupled with the connector part and fixed to the building wall or the window.

According to an embodiment, the connector part may include a plate; a protrusion protruding from one surface of the plate and having a fastening part formed on an outer circumference thereof to be coupled with the second housing; and a case disposed under the plate and seated on the holder part. The connector part may include a rotating part having at least one thread inside the case.

According to an embodiment, the mount member may be a stand-type mount member that is fixed to a shelf extending from the window.

According to an embodiment, the mount member may be a wall mount-type mount member fixedly installed on the building wall.

According to an embodiment, the mount member may include a bracket and a support fixedly installed on the building wall or the window and include an arm part extending between the holder part and the support to be rotatable about the support.

According to an embodiment, the mount member may be a window mount-type mount member installed on the window.

According to an embodiment, the mount member may include a first arm part extending from the holder part; and second arm parts orthogonal to the first arm part and respectively contacting and fixed to two vertical frames included in the window.

According to an embodiment, the second arm parts may include an extension extendable in a lengthwise direction; and at least one elastic body disposed therein, and the second arm parts may be fixedly coupled to the vertical frames included in the window using elastic repulsive force of the at least one elastic body.

According to an embodiment of the disclosure, there may be provided an electronic device for performing communication with an external electronic device while being coupled with a mount member fixable to a building wall or a window, comprising a housing configured to rotate about a first rotation axis on the mount member, the housing including a first housing; a second housing facing in a direction opposite to the first housing and couplable to the mount member; and a third housing forming a space between the first housing and the second housing; an antenna module exposed to an outside through at least a portion of the third housing and coupled to the third housing to be rotatable about a second rotation axis; and a connector part having one side detachably coupled the second housing of the electronic device and another side detachably coupled the holder part of the mount member and rotatable about the first rotation axis; wherein the antenna module is configured to rotate about the first rotation axis and/or the second rotation axis to be aligned with an antenna of the external electronic device.

According to an embodiment, when the second housing and the connector part are coupled, the second housing and the connector part together may be rotated about the first rotation axis.

According to an embodiment, the connector part may include a plate; a protrusion protruding from one surface of the plate and having a fastening part formed on an outer circumference thereof to be coupled with the second housing; and a case disposed under the plate and seated on the holder part. The connector part may include a rotating part having at least one thread inside the case.

According to an embodiment of the disclosure, there may be provided a mount member for fixing an electronic device to a window, comprising a connector part detachably coupled with the electronic device and axially coupled with the electronic device to be rotatable about the same rotation axis; a holder part detachably coupled with the connector part; a first arm part extending from the holder part; and second arm parts orthogonal to the first arm part and respectively contacting and fixed to two vertical frames included in the window.

According to an embodiment, the second arm parts may include an extension extendable in a lengthwise direction; and at least one elastic body disposed therein, and the second arm parts may be fixedly coupled to the vertical frames included in the window using elastic repulsive force of the at least one elastic body.

The embodiments disclosed herein are proposed for description and understanding of the disclosed technology and does not limit the scope of the present invention. Accordingly, the scope of the disclosure should be interpreted as including all changes or various embodiments based on the technical spirit of the disclosure.

What is claimed is:

1. An electronic device for performing communication with an external electronic device while being coupled with a mount member fixable to a building wall or a window, the electronic device comprising:
a housing configured to rotate about a first rotation axis on the mount member, the housing including a first housing; a second housing facing in a direction opposite to the first housing and couplable to the mount member; and a third housing forming a space between the first housing and the second housing;
a first antenna module exposed to an outside through at least a portion of the third housing and coupled to the third housing to be rotatable about a second rotation axis, and
a second antenna module disposed inside the housing, which is spaced apart from the first antenna module by a predetermined distance and includes a plurality of antenna patches that face in a direction from the first antenna module,
wherein the first antenna module is configured to rotate about the first rotation axis and/or the second rotation axis to be aligned with an antenna of the external electronic device.

2. The electronic device of claim 1, wherein the first antenna module is configured to support a frequency band of 3 GHz to 100 GHz.

3. The electronic device of claim 1, wherein the second antenna module is configured to support a frequency range different from that of the first antenna module, and the electronic device is configured to relay a signal received from the external electronic device through the first antenna module to a third electronic device.

4. The electronic device of claim 3, wherein the second antenna module is configured to provide Wi-Fi communication.

5. The electronic device of claim 1, further comprising a processor configured to determine a quality of a communication environment based on information related to a signal strength based on an angle and/or distance between the electronic device and the external electronic device.

6. The electronic device of claim 1, further comprising an output device configured to output information about a quality of a communication environment according to alignment with the antenna of the external electronic device.

7. The electronic device of claim 1, further comprising a plurality of pores configured to dissipate heat generated from the first antenna module.

8. The electronic device of claim 1, wherein the mount member further comprises:

a connector part detachably coupled with the second housing of the electronic device and configured to rotate about the first rotation axis; and a holder part detachably coupled with the connector part and fixed to the building wall or the window.

9. The electronic device of claim 8, wherein the connector part further comprises:

a plate;

a protrusion protruding from one surface of the plate and having a fastening part formed on an outer circumference thereof configured to be coupled with the second housing; and a case disposed under the plate and seated on the holder part, wherein the connector part includes a rotating part having at least one thread inside the case.

10. The electronic device of claim 8, wherein the mount member is a stand-type mount member that is fixed to a shelf extending from the window.

11. The electronic device of claim 8, wherein the mount member is a wall mount-type mount member fixedly installed on the building wall.

12. The electronic device of claim 11, wherein the mount member includes a bracket and a support fixedly installed on the building wall or the window and includes an arm part extending between the holder part and the support to be rotatable about the support.

13. The electronic device of claim 8, wherein the mount member is a window mount-type mount member installed on the window.

14. The electronic device of claim 13, wherein the mount member includes:

a first arm part extending from the holder part; and second arm parts orthogonal to the first arm part and respectively contacting and fixed to two vertical frames included in the window.

15. The electronic device of claim 14, wherein the second arm parts include:

an extension extendable in a lengthwise direction; and at least one elastic body disposed therein, and wherein the second arm parts are fixedly coupled to the two vertical frames included in the window using elastic repulsive force of at least one elastic body.

16. A mount member for fixing an electronic device to a window, comprising:

a connector part detachably coupled with the electronic device and axially coupled with the electronic device to be rotatable about a same rotation axis;

a holder part detachably coupled with the connector part;

a first arm part extending from the holder part;

a base configured to be fitted into a hole of the first arm part and configured to support a lower portion of the first arm part, and a second arm parts orthogonal to the first arm part and respectively contacting and fixed to two vertical frames included in the window, wherein the second arm parts include:

an extension extendable in a lengthwise direction; and at least one elastic body disposed therein, and the second arm parts are fixedly coupled to the two vertical frames included in the window using elastic repulsive force of the at least one elastic body.

\* \* \* \* \*